US012809816B2

(12) United States Patent
Kammachi Sreedhar et al.

(10) Patent No.: US 12,809,816 B2
(45) Date of Patent: Nov. 24, 2026

(54) REDUCED HEADER MODE FOR IMAGE FILE FORMAT

(71) Applicant: Nokia Technologies Oy, Espoo (FI)

(72) Inventors: Kashyap Kammachi Sreedhar, Tampere (FI); Emre Baris Aksu, Tampere (FI); Lukasz Kondrad, Munich (DE); Miska Matias Hannuksela, Tampere (FI); Lauri Aleksi Ilola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/738,776

(22) Filed: Jun. 10, 2024

(65) Prior Publication Data

US 2025/0021518 A1 Jan. 16, 2025

Related U.S. Application Data

(60) Provisional application No. 63/512,734, filed on Jul. 10, 2023.

(51) Int. Cl.
*G06F 16/00* (2019.01)
*G06F 16/11* (2019.01)

(52) U.S. Cl.
CPC .................................. *G06F 16/116* (2019.01)

(58) Field of Classification Search
None
See application file for complete search history.

(56) References Cited

U.S. PATENT DOCUMENTS

2018/0227626 A1* 8/2018 Nakazawa ......... H04N 21/4343

FOREIGN PATENT DOCUMENTS

CN 104333801 A * 2/2015 ........... H04N 21/234
GB 2575074 A * 1/2020 ....... H04N 21/85406

OTHER PUBLICATIONS

"Information technology—High efficiency coding and media delivery in heterogeneous environments—Part 12: Image File Format—Amendment 2: Support for VVC, EVC, slideshows and other improvements", ISO/IEC 23008-12: 2017/DAM 2:2021(E), 2021, 39 pages.

"Information Technology—Coding of Audio-Visual Objects—Part 12: ISO Base Media File Format", ISO/IEC 14496-12, Fifth edition, Dec 15, 2015, 248 pages.

(Continued)

*Primary Examiner* — Tuankhanh D Phan
(74) *Attorney, Agent, or Firm* — McCarter & English LLP; Benjamin A. Ailes

(57) ABSTRACT

Various embodiments describe an apparatus, a method, and a computer program product. The example apparatus includes at least one processor; and at least one non-transitory memory storing instructions that, when executed by the at least one processor, cause the apparatus at least to perform: writing an indication of presence of a reduced header mode or compact metadata in a file, wherein a reduced header comprises information for processing one or more media items; writing a MetaBox at file-level, wherein the MetaBox is extended to indicate the reduced header mode; and signaling the extension by using a new version of the MetaBox or flags of the MetaBox.

20 Claims, 7 Drawing Sheets

1100

(56) References Cited

OTHER PUBLICATIONS

"Information Technology—Coding of Audio-Visual Objects—Part 14: MP4 File Format", ISO/IEC 14496-14, First edition, Nov. 15, 2003, 18 pages.
"Information Technology—Coding of Audio-Visual Objects—Part 15: Advanced Video Coding (AVC) File Format", ISO/IEC 14496-15, First edition, Apr. 15, 2004, 29 pages.
"High Efficiency Video Coding", Series H: Audiovisual and Multimedia Systems, Infrastructure of audiovisual services—Coding of moving video, Recommendation ITU-T H.265, Feb. 2018, 692 pages.
"Slimmed down container mode", github, Retrieved on Jul. 1, 2024, Webpage available at : https://github.com/AOMediaCodec/av1-avif/issues/121.
"Information Technology—MPEG Systems Technologies—Part 14: Partial file format", ISO/IEC 23001-14, First Edition, Jan. 2019, 10 pages.
Deutsch, "DEFLATE Compressed Data Format Specification version 1.3", RFC 1951, Network Working Group, May 1996, pp. 1-14.
"Defining constants in HTML [duplicate]", Stack Overflow, Retrieved on Jul. 1, 2024, Webpage available at : https://stackoverflow.com/questions/37807597/defining-constants-in-html.
"Video back-channel messages for conveyance of status information and requests from a video receiver to a video sender", Series H: Audiovisual and Multimedia Systems, Infrastructure of audiovisual services—Coding of moving video, ITU-T Recommendation H.271, May 2006, 22 pages.

* cited by examiner

1100

1000

REDUCED HEADER MODE FOR IMAGE FILE FORMAT

CROSS-REFERENCE TO RELATED APPLICATION

This application claims the benefit of U.S. Provisional Application No. 63/512,734, filed Jul. 10, 2023.

TECHNICAL FIELD

The examples and non-limiting embodiments relate generally to file format, and more particularly, to method, apparatus, and computer program product for reduced header mode for image file format.

BACKGROUND

It is known to provide image file format.

SUMMARY

An example apparatus includes at least one processor; and at least one non-transitory memory storing instructions that, when executed by the at least one processor, cause the apparatus at least to perform: writing an indication of presence of a reduced header mode or compact metadata in a file, wherein a reduced header comprises information for processing one or more media items; and signaling the file to a client-side device.

The example apparatus may further include, wherein the apparatus is further caused to perform: indicating a normal header mode currently defined in high efficiency image file.

The example apparatus may further include, wherein the apparatus is further caused to perform: defining a file description box to indicate the reduced header mode and the normal header mode.

The example apparatus may further include, wherein the file description box comprises information which allows the file to be used in the reduced header mode or the normal header mode.

The example apparatus may further include, wherein the file description box is present at the file-level immediately following a file type box, or an extended type box, an original file type box, or a segment type box, with the extended type box and/or a free space box in between.

The example apparatus may further include, wherein the file description box is comprised in the extended type box or the original file type box.

The example apparatus may further include, wherein the apparatus is further caused to perform: extending an original file type box to indicate a byte range or offset to be used for processing the file in the reduced header mode or the normal header mode.

The example apparatus may further include, wherein the reduced header mode imposes one or more of following constraints: a box order of the file is subject to specific constraints; the one or more media item count is limited; an identified media data box is to be used instead of a media data box for re-arranging file-level boxes within the file; the one or more media item count per identified media data box or media data box is to be constrained to be equal to 1, the number of extents per media item is limited to be equal to 1, and all the bytes in the identified media data box or the media data box belong to a single media item; or when multiple identified media data boxes or media data boxes are present and each of them comprises one media item, the order of the identified media data boxes or the media data boxes are constrained according to the role or characteristics of the one media bitem.

The example apparatus may further include, wherein apparatus is further caused to perform: including in the file description box one or more hash values that are derived from at least one of pre-defined boxes, indicated boxes, syntax structures, or syntax elements.

The example apparatus may further include, wherein the apparatus is further caused to perform: defining a multipurpose internet mail extension (MIME) parameter that is indicative of the information of the file description box.

The example apparatus may further include, the apparatus us further caused to perform: including a MIME type comprising a file description MIME parameter to characterize the file.

The example apparatus may further include, wherein the apparatus is further caused to perform: including a file index parameter to characterize the file.

The example apparatus may further include, wherein the apparatus is further caused to perform: including in the file description box information characterizing the one or more media items, wherein the information is sufficient to select and initialize a decoder to decode a media item of the one or more media items.

The example apparatus may further include, wherein the apparatus is further caused to perform: including, in an identified media data box or a media data box, information characterizing the one or more media item, wherein the information is sufficient to select and initialize a decoder to decode a media item of the one or more media items.

Another example apparatus comprising at least one processor; and at least one non-transitory memory storing instructions that, when executed by the at least one processor, cause the apparatus at least to perform: receiving and parsing a file comprising: an indication of presence of a reduced header mode or compact metadata; and a reduced header comprising information for processing the one or more media items; and processing the reduced header data to extract information needed for decoding of the one or more media items.

The example apparatus may further include, wherein the apparatus is further caused to perform: obtaining at least a file description box of a first file and parsing from the file description box one or more first hash values derived from pre-defined boxes, indicated boxes, syntax structures, or syntax elements.

The example apparatus may further include, wherein the apparatus is further caused to perform: deriving and parsing one or more second hash values from a second file; and using data of the second file to process the first file when the first hash value matches with the second hash value.

The example apparatus may further include, wherein the apparatus is further caused to perform: reading a multipurpose internet mail extension (MIME) type comprising a file description MIME parameter that characterizes the file.

The example apparatus may further include, wherein the apparatus is further caused to perform: reading a file index parameter that characterizes the file; determining which boxes, syntax structures, and/or syntax elements are downloaded and/or are omitted from downloading; determining byte range to be downloaded based on the file index parameter; and issuing one or more requests to download the determined byte range.

The example apparatus may further include, wherein the apparatus is further caused to perform: parsing from a file description box information characterizing the one or more media items; identifying a media item data for the one or more media items from one or more identified media data boxes or media data boxes; selecting and initializing a decoder based on the information characterizing the one or more item; and causing the decoding of the identified item data.

The example apparatus may further include, wherein the apparatus is further caused to perform: parsing, from an identified media data box or a media data box, information characterizing the one or more media items; identifying a media item data for the one or more media items from the identified media data box or the media data box information; selecting and initializing a decoder based on the information characterizing the one or more media item; and causing decoding of the identified media item data.

Yet another example apparatus includes at least one processor; and at least one non-transitory memory storing instructions that, when executed by the at least one processor, cause the apparatus at least to perform: writing following in a container file: a common initialization information shared between two or more media items; data of the two or more media items; and information about mapping from keywords or variables within a markup language to the two or more media items and common initialization information; creating the markup language including following: information to access the common initialization information and information for accessing the two or more media items independently; and the common initialization information and the two or more media items data within the markup language referenced using the keywords or variables.

The example apparatus may further include, wherein the apparatus is further caused to perform: modifying a type of the two or more media items to indicate a reduced header mode; creating an external common initialization information; and replacing metadata information with file description box for providing information on accessing the external common initialization information.

The example apparatus may further include, wherein the apparatus is further caused to perform extending a file-level MetaBox to indicate the reduced header mode; and signalling the extension by using a new version of the MetaBox or flags of the MetaBox structure.

The example apparatus may further include, wherein the apparatus is further caused to define a compact meta box at a file-level, wherein presence of the compact meta box at the file-level indicates the reduced header mode.

The example apparatus may further include, wherein the apparatus is caused to perform: including one or more sets of pre-defined information in the compact meta box; and indicating a set of pre-defined information to be used for parsing of the compact meta box, wherein the indication is used for selecting and initializing a decoder for decoding the two or more media items.

The example apparatus may further include, wherein the apparatus is further caused to perform: generating a MetaBox and a modified file, wherein the MetaBox is generated from the compact meta box by including the pre-defined information into the MetaBox; and writing the modified file into a file system or providing the modified file to a legacy file reader that is not aware of the compact meta box.

The example apparatus may further include, wherein the apparatus is further caused to perform: compressing meta box present at the file-level.

The example apparatus may further include, wherein the apparatus is further caused to perform: defining a compressed meta box comprising a compressed version of a file-level MetaBox boxpayload.

The example apparatus may further include, wherein the compressed meta box and the MetaBox are present at the file-level to support the reduced header mode and a normal mode processing of the two or more media items.

The example apparatus may further include, wherein the compressed meta box or the MetaBox are present at the file-level.

The example apparatus may further include, wherein the apparatus is further caused to perform: defining a compact item header box, wherein the compact item header box is comprised in the meta box; extending the MetaBox to indicate presence of compact item header box; and signalling the extension by using a new version of the MetaBox or by using the flags of the MetaBox structure.

The example apparatus may further include, wherein the apparatus is further caused to include following boxes, used for indicating the two or more media items, in the compact item header box in any order: a primary item box; a data information box; an item location box; an item protection box; an item information box; an internet protocol network multipathing control box; an item reference box; item properties; an XML container; an item data box; a binary XML container; and/or a file delivery item information.

The example apparatus may further include, wherein the apparatus is further caused to perform: compressing included payload to form a box payload of the compact header box.

The example apparatus may further include, wherein the apparatus is further caused to define a compressed data, wherein the compressed data comprises the compressed payload after the concatenation of two or more of the following boxes in any order: the primary item box; the data information box; the item location box; the item protection box; the item information box; the internet protocol network multipathing control box; the item reference box; the item properties; the XML container; the binary XML container; or the file delivery item information.

The example apparatus may further include, wherein when the MetaBox supports the reduced header mode, the MetaBox includes a mandatory HandlerBox with a specific handler_type and the compact item header box.

The example apparatus may further include, wherein when the MetaBox supports reduced the header mode, the MetaBox comprises boxes supported in version=0. For example, item information box, item properties box, item protection box, and the like.

The example apparatus may further include, wherein when the MetaBox comprises boxes supported in version=0 this indicates that a subset of items represented by the MetaBox are defined in reduced header mode and remaining subset of items represented by the MetaBox are defined in normal header mode.

The example apparatus may further include, wherein the file comprises a first Metabox and a second MetaBox, wherein the first Metabox represents one or more items in the reduced header mode and the second MetaBox represents one or more items in the normal header mode.

The example apparatus may further include, wherein the reduced header mode supports one or more of the following: representation of a single item and/or a single image item; representation of a single item and/or a single image item together with an auxiliary image item; or representation of multiple items and/or multiple image items;

The example apparatus may further include, wherein when the reduced header mode supports representation of the single image item, the compact item header box includes the primary item box indicating that the single image item is a primary item.

The example apparatus may further include, wherein when the reduced header mode supports representation of the single image item, the compact item header box does not include the primary item box, and wherein in the absence of primary item box, the primary item is concluded to be the single image item represented in the compact item header box.

The example apparatus may further include, wherein when the reduced header mode supports representation of the single item and/or the single image item together with the auxiliary image item, the compact item header box includes the primary item box indicating the image item that is a primary item.

The example apparatus may further include, wherein when the reduced header mode supports representation of the single item and/or the single image item together with an auxiliary image item, the compact item header box does not include the primary item box, and wherein in the absence of primary item box, an item_ID of a primary item is concluded to be either the image item with a lowest item_ID among two image items represented by the reduced header mode or the item_ID of an image item that does not have an AuxiliaryTypeProperty associated with it.

The example apparatus may further include, wherein when the reduced header mode supports representation of the multiple items and/or the multiple image items, the compact item header box includes the primary item box indicating an image item that is a primary item.

The example apparatus may further include, wherein when the reduced header mode supports representation of the multiple items and/or the multiple image items, the compact item header box does not include the primary item box, and wherein in the absence of the primary item box an item_ID of a primary item is concluded to be an item_ID of an image item with a lowest item_ID among all image items represented by the reduced header mode.

The example apparatus may further include, wherein when the reduced header mode supports representation of the multiple items and/or the multiple image items, the compact item header box does not include the primary item box, and wherein in the absence of the primary item box, an item_ID of a primary item is concluded to be an item_ID of an image item with highest item_ID among all the image items represented by the reduced header mode.

The example apparatus may further include, wherein the item location box indicates a directory of resource by locating a container of the resource, an offset within the container, and a length of the resource.

The example apparatus may further include, wherein the compact item header box includes the data information box when the compact item header box includes the item location box and the construction_method=0 and the data_reference_index>0, indicating that data is present in the same file as the MetaBox and is referenced by the data reference box with a specific index in the data information box.

Still another example apparatus includes at least one processor; and at least one non-transitory memory storing instructions that, when executed by the at least one processor, cause the apparatus at least to perform: receiving and parsing a markup language comprising following: information to access common initialization information together with information for accessing two or more media items independently, wherein the common initialization information is shared between the two or more media items; and the common initialization information and media item data within the markup language referenced using keywords or variables; requesting the common initialization information; receiving and parsing a file comprising following: the common initialization information; and information about the mapping from the keywords or variables within the markup language to the two or more media items and the common initialization information; requesting the media item data based on the parsed common initialization information; and receiving and parsing the file comprising data of the two or more media item.

The example apparatus may further include, wherein the file comprises a file-level MetaBox comprising a compact item header box, and wherein the apparatus is further caused to perform: decompressing a box payload of the compact item header box to obtain a datastream of boxes; parsing the datastream of boxes; and reconstructing a MetaBox at the file-level by replacing the compact header box with the output boxes after decompressing the box payload of the compact item header box.

An example method includes: writing an indication of presence of a reduced header mode or compact metadata in a file, wherein a reduced header comprises information for processing one or more media items; and signaling the file to a client-side device.

Another example method includes: receiving and parsing a markup language comprising following: information to access common initialization information together with information for accessing two or more media items independently, wherein the common initialization information is shared between the two or more media items; and the common initialization information and media item data within the markup language referenced using keywords or variables; requesting the common initialization information; receiving and parsing a file comprising following: the common initialization information; and information about the mapping from the keywords or variables within the markup language to the two or more media items and the common initialization information; requesting the media item data based on the parsed common initialization information; and receiving and parsing the file comprising data of the two or more media item.

Yet another example method includes: writing following in a container file: a common initialization information shared between two or more media items; data of the two or more media items; and information about mapping from keywords or variables within a markup language to the two or more media items and common initialization information; creating the markup language including following: information to access the common initialization information and information for accessing the two or more media items independently; and the common initialization information and the two or more media items data within the markup language referenced using the keywords or variables.

Still another example method includes: receiving and parsing a markup language comprising following: information to access common initialization information together with information for accessing two or more media items independently, wherein the common initialization information is shared between the two or more media items; and the common initialization information and media item data within the markup language referenced using keywords or variables; requesting the common initialization information; receiving and parsing a file comprising following: the common initialization information; and information about the mapping from the keywords or variables within the markup language to the two or more media items and the common initialization information; requesting the media item data based on the parsed common initialization information; and receiving and parsing the file comprising data of the two or more media item.

Still another example apparatus includes at least one processor; and at least one memory storing instructions that, when executed by the at least one processor, cause the apparatus at least to perform: writing an indication of presence of a reduced header mode or compact metadata in a file, wherein a reduced header comprises information for processing one or more media items; writing a MetaBox at file-level, wherein the MetaBox is extended to indicate the reduced header mode; and signaling the extension by using a new version of the MetaBox or flags of the MetaBox.

The example apparatus may further include, wherein the apparatus is caused to perform: indicating a set of pre-defined information. from one or more sets of pre-defined information, to be used for parsing of the MetaBox, wherein the indication is intended to be used to select and initialize a decoder that decodes the one or more media items.

The example apparatus may further include, wherein the apparatus is further caused to perform: defining a compact item header structure, wherein the compact item header structure is comprised in the MetaBox, and wherein the compact item header structure comprises properties describing the one or more media items; and extending the MetaBox to indicate presence of compact item header structure.

The example apparatus may further include, wherein the indication of presence of the reduced header mode is comprised in a FileTypeBox.

Still another example apparatus includes at least one processor; and at least one memory storing instructions that, when executed by the at least one processor, cause the apparatus at least to perform: receiving an extension by using a new version of a MetaBox or flags of a MetaBox, wherein the extension comprises the MetaBox to indicate a reduced header mode or a compact metadata in a file; and processing one or more media items based at least on information comprised in the reduced header.

The example apparatus may further include, wherein the apparatus is caused to perform: receiving an indication for indicating a set of pre-defined information, from one or more sets of pre-defined information, to be us ed for parsing of the MetaBox; parsing of the MetaBox based on the set of pre-defined information; selecting and initializing a decoder based on the indication; and decoding the one or more media items.

The example apparatus may further include, wherein the apparatus is further caused to perform: receiving a compact item header structure, wherein the compact item header structure is comprised in the MetaBox, and wherein the MetaBox is extended to indicate presence of compact item header structure, wherein the compact item header structure comprises properties describing the one or more media items; and processing the one or more media items based on the compact item header structure.

The example apparatus may further include, wherein the apparatus is further caused to perform: reading, parsing or obtaining the indication of presence of the reduced header mode from a FileTypeBox.

Still another example apparatus includes at least one processor; and at least one memory storing instructions that, when executed by the at least one processor, cause the apparatus at least to perform: receiving a file; reading an indication of presence of a reduced header mode or compact metadata from the file, wherein a reduced header comprises information for processing one or more media items, wherein the indication is a first file-level MetaBox extended with a new version of the MetaBox or flags of the MetaBox structure; writing a modified file including a second file-level MetaBox, wherein the second file-level MetaBox is generated from the first file-level MetaBox by including the pre-defined information into the second file-level MetaBox; and writing the modified file into a file system or providing the modified file to a legacy file reader that is not aware of the extensions with the new version of the MetaBox or the flags of the MetaBox structure.

Still another example apparatus includes at least one processor; and at least one memory storing instructions that, when executed by the at least one processor, cause the apparatus at least to perform: receiving a file; reading an indication of presence of a reduced header mode or compact metadata from the file, wherein a reduced header comprises information for processing one or more media items, wherein the indication is a first file-level MetaBox extended with a new version of the MetaBox or flags of the MetaBox structure, and wherein the first file-level MetaBox comprises a compact item header; decompressing the compact item header to obtain a datastream of boxes; reconstructing a second file-level MetaBox by including the datastream of boxes within the second file-level MetaBox; and parsing the datastream of boxes.

Still another example method includes: writing an indication of presence of a reduced header mode or compact metadata in a file, wherein a reduced header comprises information for processing one or more media items; writing a MetaBox at file-level, wherein the MetaBox is extended to indicate the reduced header mode; and signaling the extension by using a new version of the MetaBox or flags of the MetaBox.

The example method may further include: indicating a set of pre-defined information. from one or more sets of pre-defined information, to be used for parsing of the MetaBox, wherein the indication is intended to be used to select and initialize a decoder that decodes the one or more media items.

The example method may further include: defining a compact item header structure, wherein the compact item header structure is comprised in the MetaBox, and wherein the compact item header structure comprises properties describing the one or more media items; and extending the MetaBox to indicate presence of compact item header structure.

The example method may further include, wherein the indication of presence of the reduced header mode is comprised in a FileTypeBox.

Still another example method includes: receiving an extension by using a new version of a MetaBox or flags of a MetaBox, wherein the extension comprises the MetaBox to indicate a reduced header mode or a compact metadata in a file; and processing one or more media items based at least on information comprised in the reduced header.

The example method may further include: receiving an indication for indicating a set of pre-defined information, from one or more sets of pre-defined information, to be used for parsing of the MetaBox; parsing of the MetaBox based on the set of pre-defined information; selecting and initializing a decoder based on the indication; and decoding the one or more media items.

The example method may further include, wherein the apparatus is further caused to perform: receiving a compact item header structure, wherein the compact item header structure is comprised in the MetaBox, and wherein the MetaBox is extended to indicate presence of compact item header structure, wherein the compact item header structure comprises properties describing the one or more media items; and processing the one or more media items based on the compact item header structure.

The example method may further include: reading, parsing or obtaining the indication of presence of the reduced header mode from a FileTypeBox.

Still another example method includes: receiving a file; reading an indication of presence of a reduced header mode or compact metadata from the file, wherein a reduced header comprises information for processing one or more media items, wherein the indication is a first file-level MetaBox extended with a new version of the MetaBox or flags of the MetaBox structure; writing a modified file including a second file-level MetaBox, wherein the second file-level MetaBox is generated from the first file-level MetaBox by including the pre-defined information into the second file-level MetaBox; and writing the modified file into a file system or providing the modified file to a legacy file reader that is not aware of the extensions with the new version of the MetaBox or the flags of the MetaBox structure.

Still another example method includes: receiving a file; reading an indication of presence of a reduced header mode or compact metadata from the file, wherein a reduced header comprises information for processing one or more media items, wherein the indication is a first file-level MetaBox extended with a new version of the MetaBox or flags of the MetaBox structure, and wherein the first file-level MetaBox comprises a compact item header; decompressing the compact item header to obtain a datastream of boxes; reconstructing a second file-level MetaBox by including the datastream of boxes within the second file-level MetaBox; and parsing the datastream of boxes.

An example non-transitory computer readable medium includes program instructions that, when executed by an apparatus, cause the apparatus to perform: writing an indication of presence of a reduced header mode or compact metadata in a file, wherein a reduced header comprises information for processing one or more media items; writing a MetaBox at file-level, wherein the MetaBox is extended to indicate the reduced header mode; and signaling the extension by using a new version of the MetaBox or flags of the MetaBox.

Another example non-transitory computer readable medium includes program instructions that, when executed by an apparatus, cause the apparatus to perform: receiving a file; reading an indication of presence of a reduced header mode or compact metadata from the file, wherein a reduced header comprises information for processing one or more media items, wherein the indication is a first file-level MetaBox extended with a new version of the MetaBox or flags of the MetaBox structure; writing a modified file including a second file-level MetaBox, wherein the second file-level MetaBox is generated from the first file-level MetaBox by including the pre-defined information into the second file-level MetaBox; and writing the modified file into a file system or providing the modified file to a legacy file reader that is not aware of the extensions with the new version of the MetaBox or the flags of the MetaBox structure.

Yet another example non-transitory computer readable medium includes program instructions that, when executed by an apparatus, cause the apparatus to perform: receiving a file; reading an indication of presence of a reduced header mode or compact metadata from the file, wherein a reduced header comprises information for processing one or more media items, wherein the indication is a first file-level MetaBox extended with a new version of the MetaBox or flags of the MetaBox structure; writing a modified file including a second file-level MetaBox, wherein the second file-level MetaBox is generated from the first file-level MetaBox by including the pre-defined information into the second file-level MetaBox; and writing the modified file into a file system or providing the modified file to a legacy file reader that is not aware of the extensions with the new version of the MetaBox or the flags of the MetaBox structure.

Still another example non-transitory computer readable medium includes program instructions that, when executed by an apparatus, cause the apparatus to perform: receiving a file; reading an indication of presence of a reduced header mode or compact metadata from the file, wherein a reduced header comprises information for processing one or more media items, wherein the indication is a first file-level MetaBox extended with a new version of the MetaBox or flags of the MetaBox structure, and wherein the first file-level MetaBox comprises a compact item header; decompressing the compact item header to obtain a datastream of boxes; reconstructing a second file-level MetaBox by including the datastream of boxes within the second file-level MetaBox; and parsing the datastream of boxes.

Still another non-transitory computer readable medium comprising program instructions that, when executed by an apparatus, cause the apparatus to perform the methods as described in any of the previous paragraphs.

An apparatus comprising means for performing methods as described in any of the previous paragraphs.

BRIEF DESCRIPTION OF THE DRAWINGS

The foregoing embodiments and other features are explained in the following description, taken in connection with the accompanying drawings, wherein.

DETAILED DESCRIPTION OF EXAMPLE EMBODIMENTS

Figure 2:
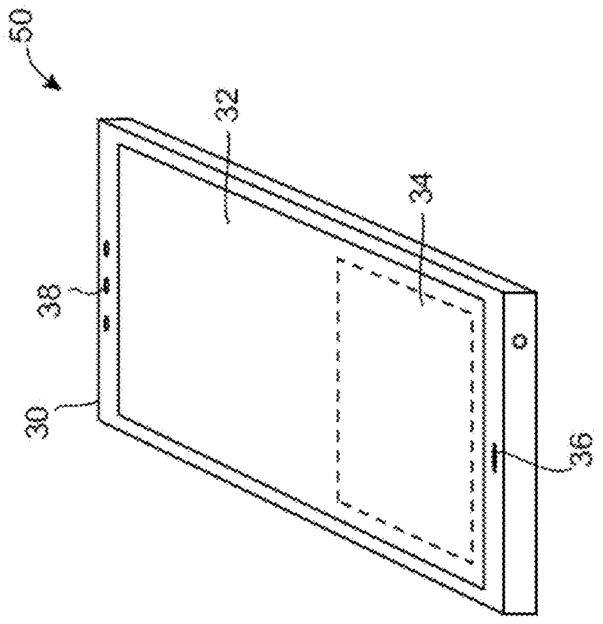
FIG. 2 shows schematically a user equipment suitable for employing embodiments of the examples described herein.

The following acronyms and abbreviations that may be found in the specification and/or the drawing figures are defined as follows:

Some embodiments will now be described more fully hereinafter with reference to the accompanying drawings, in which some, but not all, embodiments are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms 'data,' 'content,' 'information,' and similar terms may be used interchangeably to refer to data capable of being transmitted, received and/or stored in accordance with embodiments of the present invention. Thus, use of any such terms should not be taken to limit the spirit and scope of embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium,' which refers to a non-transitory physical storage medium (e.g., volatile or non-volatile memory device), can be differentiated from a 'computer-readable transmission medium,' which refers to an electromagnetic signal.

A method, apparatus and computer program product are provided in accordance with example embodiments for implementing reduced header mode for image file format.

Figure 1:
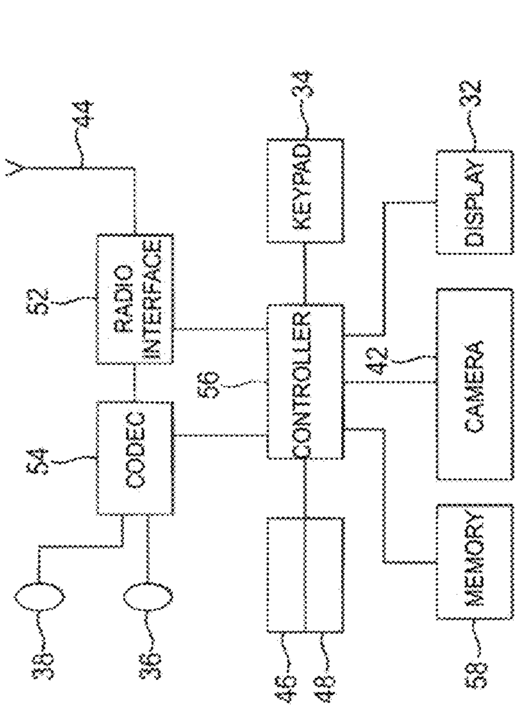
FIG. 1 shows schematically an electronic device employing embodiments of the examples described herein.

In an example, the following describes in detail suitable apparatus and possible mechanisms for implementing reduced header mode for image file format. In this regard reference is first made to FIG. 1 and FIG. 2, where FIG. 1 shows an example block diagram of an apparatus 50. The apparatus may be an internet of things (IoT) apparatus configured to perform various functions, for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The apparatus 50, may for example be, a mobile terminal or user equipment of a wireless communication system, a sensor device, a tag, or a lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 may further comprise a display 32, for example, in the form of a liquid crystal display, light emitting diode display, organic light emitting diode display, and the like. In other embodiments of the examples described herein the display may be any suitable display technology suitable to display media or multimedia content, for example, an image or a video. The apparatus 50 may further comprise a keypad 34. In other embodiments of the examples described herein any suitable data or user interface mechanism may be employed. For example, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, a processor or a processor circuitry for controlling the apparatus 50. The controller 56 may be connected to a memory 58 which in embodiments of the examples described herein may store both data in the form of an image, audio data and video data, and/or may also store instructions for implementation on the controller 56. The controller 56 may further be connected to codec circuitry 54 suitable for carrying out coding and/or decoding of audio, image and/or video data or assisting in coding and/or decoding carried out by the controller.

The apparatus 50 may further comprise a card reader 48 and a smart card 46, for example, a universal integrated circuit card (UICC) and UICC reader for providing user information and being suitable for providing authentication information for authentication and authorization of the user at a network.

The apparatus 50 may comprise radio interface circuitry 52 connected to the controller and suitable for generating wireless communication signals, for example, for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec circuitry 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Internet media types, also known as multipurpose internet mail extension (MIME) types, are used by various applications to identify the type of a resource or a file. MIME types consist of a media type, a subtype, and zero or more optional parameters.

As described, MIME is an extension to an email protocol which makes it possible to transmit and receive different kinds of data files on the Internet, for example video, audio, images, software, and the like. An internet media type is an identifier used on the Internet to indicate the type of data that a file includes. Such internet media types may also be called as content types. Several MIME type/subtype combinations exist that can indicate different media formats. Content type information may be included by a transmitting entity in a MIME header at the beginning of a media transmission. A receiving entity thus may need to examine the details of such media content to determine if the specific elements can be rendered given an available set of codecs. Especially, when the end system has limited resources, or the connection to the end systems has limited bandwidth, it may be helpful to know from the content type alone if the content can be rendered.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. A URI comprises a scheme part (identifying e.g. the protocol for the URI) and a hierarchical part identifying the resource, and these two parts are separated by a colon character. A URI may optionally comprise a query part (separated by the character '?') and/or a fragment part (separated by the character '#'). The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

A hash value may be defined to be a result of a hash function. A hash value may be alternatively or additionally referred to as a checksum or a hash sum. A hash function may be defined as is any function that can be used to map digital data of arbitrary size to digital data of fixed size, with slight differences in input data possibly producing big differences in output data. A cryptographic hash function may be defined as a hash function that is intended to be practically impossible to invert, i.e., to create the input data based on the hash value alone. Cryptographic hash function may comprise, e.g., the MD5 function. An MD5 value may be a null-terminated string of UTF-8 characters containing a base64 encoded MD5 digest of the input data. One method of calculating the string is specified in IETF RFC 1864. It should be understood that instead of or in addition to MD5, other types of integrity check schemes could be used in various embodiments, such as different forms of the cyclic redundancy check (CRC), such as the CRC scheme used in ITU-T Recommendation H.271.

ISO/International Electrotechnical Commission (IEC) 23008-12-High Efficiency Image File Format or HEIF is designed to enable the interchange of images and image sequences, as well as their associated metadata. Images can be stored as items using the support for untimed data storage in ISOBMFF, utilizing the MetaBox. A file may include any number of image items.

ISO Base Media File Format

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format or file format for MPEG-4 Part 14 files), file format for network abstraction ayer (NAL) unit structured video (ISO/IEC 14496-15) and High Efficiency Video Coding standard (HEVC or H.265/HEVC).

Some concepts, structures, and specifications of ISOBMFF are described below as an example of a container file format, based on which some embodiments may be implemented. The features described in various embodiments are not limited to ISOBMFF, but rather the description is given for one possible basis on top of which at least some embodiments may be partly or fully realized.

A basic building block in the ISO base media file format is called a box. Each box has a header and a payload. The box header indicates the type of the box and the size of the box in terms of bytes. Box type is typically identified by an unsigned 32-bit integer, interpreted as a four character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks may be collectively called media tracks, and they include an elementary media stream. Other track types comprise hint tracks and timed metadata tracks.

An IdentifiedMediaDataBox may have the same semantics as a MediaDataBox has but it additionally includes an identifier that is used in setting up data references to the included media data. The identifier may, for example, be the first element included by the identified media data box. The media data offsets are relative to the first byte of the payload of the referred IdentifiedMediaDataBox. In other words, media data offset 0 points to the first byte of the payload of the referred IdentifiedMediaDataBox.

Tracks comprise samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, including cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox includes an entry-count and as many sample entries as the entry-count indicates. The format of sample entries is track-type specific but derived from generic classes (e.g., VisualSampleEntry, AudioSampleEntry). Which type of sample entry form is used for derivation of the track-type specific sample entry format is determined by the media handler of the track.

The track reference mechanism may be used to associate tracks with each other. The TrackReferenceBox includes box(es), each of which provides a reference from the including track to a set of other tracks. These references are labeled through the box type (e.g., the four-character code of the box) of the included box(es).

The ISO Base Media File Format includes three mechanisms for timed metadata that may be associated with particular samples: sample groups, timed metadata tracks, and sample auxiliary information. A derived specification may provide similar functionality with one or more of these three mechanisms.

A sample grouping in the ISO base media file format and its derivatives, such as the advanced video coding (AVC) file format and the scalable video coding (SVC) file format, may be defined as an assignment of each sample in a track to be a member of one sample group, based on a grouping criterion. A sample group in a sample grouping is not limited to being contiguous samples and may include non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) includes a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that may be used, for example, to indicate a sub-type of the grouping.

In ISOMBFF, an edit list provides a mapping between the presentation timeline and the media timeline. Among other things, an edit list provides for the linear offset of the presentation of samples in a track, provides for the indication of empty times and provides for a particular sample to be dwelled on for a certain period of time. The presentation timeline may be accordingly modified to provide for looping, such as for the looping videos of the various regions of the scene. One example of the box that includes the edit list, the EditListBox, is provided below:

```
aligned(8) class EditListBox extends FullBox('elst', version, flags) {
unsigned int(32) entry__count;
or (i=1; i <= entry__count; i++) {
if (version==1) {
unsigned int(64) segment__duration;
int(64) media__time;
} else { // version==0
unsigned int(32) segment__duration;
int(32) media__time;
}
```

-continued

```
int(16) media__rate__integer;
int(16) media__rate__fraction = 0;
}
}
```

In ISOBMFF, an EditListBox may be included in EditBox, which is included in TrackBox ('trak').

In this example of the edit list box, flags specifies the repetition of the edit list. By way of example, setting a specific bit within the box flags (the least significant bit, e.g., flags & 1 in ANSI-C notation, where & indicates a bit-wise AND operation) equal to 0 specifies that the edit list is not repeated, while setting the specific bit (.g., flags & 1 in ANSI-C notation) equal to 1 specifies that the edit list is repeated. The values of box flags greater than 1 may be defined to be reserved for future extensions. As such, when the edit list box indicates the playback of zero or one samples, (flags & 1) shall be equal to zero. When the edit list is repeated, the media at time 0 resulting from the edit list follows immediately the media having the largest time resulting from the edit list such that the edit list is repeated seamlessly.

In ISOBMFF, a Track group enables grouping of tracks based on certain characteristics or the tracks within a group have a particular relationship. Track grouping, however, does not allow any image items in the group.

The syntax of TrackGroupBox in ISOBMFF is as follows:

```
aligned(8) class TrackGroupBox extends Box('trgr') {
}
aligned(8) class TrackGroupTypeBox(unsigned int(32)
track__group__type) extends
FullBox(track__group__type, version = 0, flags = 0)
{
  unsigned int(32) track__group__id;
  // the remaining data may be specified for a particular
  track__group__type
}
```

track_group_type indicates the grouping_type and shall be set to one of the following values, or a value registered, or a value from a derived specification or registration:

'msrc' indicates that this track belongs to a multi-source presentation. The tracks that include the same value of track_group_id within a TrackGroupTypeBox of track_group_type 'msrc' are mapped as being originated from the same source. For example, a recording of a video telephony call may have both audio and video for both participants, and the value of track_group_id associated with the audio track and the video track of one participant differs from value of track_group_id associated with the tracks of the other participant.

The pair of track_group_id and track_group_type identifies a track group within the file. The tracks that include a particular TrackGroupTypeBox having the same value of track_group_id and track_group_type belong to the same track group.

The Entity grouping is similar to track grouping but enables grouping of both tracks and image items in that same group.

The syntax of EntityToGroupBox in ISOBMFF is as follows:

```
aligned(8) class EntityToGroupBox(grouping_type, version, flags)
extends FullBox(grouping_type, version, flags) {
   unsigned int(32) group_id;
   unsigned int(32) num_entities_in_group;
   for(i=0; i<num_entities_in_group; i++)
      unsigned int(32) entity_id;
}
```

group_id is a non-negative integer assigned to the particular grouping that shall not be equal to any group_id value of any other EntityToGroupBox, any item_ID value of the hierarchy level (file, movie, or track) that includes the GroupsListBox, or any track_ID value (when the GroupsListBox is included in the file level).

num_entities_in_group specifies the number of entity_id values mapped to this entity group.

entity_id is resolved to an item, when an item with item_ID equal to entity_id is present in the hierarchy level (file, movie, or track) that includes the GroupsListBox, or to a track, when a track with track_ID equal to entity_id is present and the GroupsListBox is included in the file level.

Files conforming to the ISOBMFF may include any non-timed objects, referred to as items, meta items, or metadata items, in a meta box (four-character code: "meta"). While the name of the meta box refers to metadata, items may generally include metadata or media data. The meta box may reside at the top level of the file, within a movie box (four-character code: "moov"), and within a track box (four-character code: 'trak'), but at most one meta box may occur at each of the file level, movie level, or track level. The meta box may be required to include a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be, for example, stored in the 'idat' box of the meta box or in an 'mdat' box or reside in a separate file. When the metadata is located external to the file then its location may be declared by the DataInformationBox (four-character code: 'dinf'). In the specific case that the metadata is formatted using extensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource may be formed by concatenating the extents.

A common base structure is used to include general untimed metadata. This structure is called the MetaBox as it was originally designed to carry metadata, e.g., data that is annotating other data. However, it is now used for a variety of purposes including the carriage of data that is not annotating other data, especially when present at 'file level'.

A MetaBox may have the following syntax:

-continued

```
aligned(8) class MetaBox (handler_type)
   extends FullBox('meta', version = 0, 0) {
   HandlerBox(handler_type)     theHandler;
   PrimaryItemBox               primary_resource;   // optional
   DataInformationBox           file_locations;     // optional
   ItemLocationBox              item_locations;     // optional
   ItemProtectionBox            protections;        // optional
   ItemInfoBox                  item_infos;         // optional
   IPMPControlBox               IPMP_control;       // optional
   ItemReferenceBox             item_refs;          // optional
   ItemDataBox                  item_data;          // optional
   ItemPropertiesBox            item_properties;    // optional
   Box                          other_boxes[ ];     // optional
}
```

The MetaBox is required to include a HandlerBox indicating the structure or format of the MetaBox contents.

All other included boxes are specific to the format specified by the HandlerBox.

The other boxes defined here may be defined as optional or mandatory for a given format. When they are used, then they shall take the form specified here. These optional boxes include a DataInformationBox, which documents other files in which metadata values (e.g., pictures) are placed, and an ItemLocationBox, which documents where in those files each item is located (e.g. in the common case of multiple pictures stored in the same file).

At most one MetaBox may occur at each of the file level, segment, movie level, or track level.

When an ItemProtectionBox occurs, then some or all of the metadata, including possibly the primary resource, may have been protected and be un-readable unless the protection system is taken into account.

The MetaBox is unusual in that it is a container box yet extends a FullBox, and not a Box.

Metadata items are identified by item_ID. Within a given MetaBox, a given item_ID shall uniquely refer to a single item. When an item is updated in movie fragments, the item_ID refers to the latest received version.

Derived specifications may further restrict the criteria for uniqueness: unique among the item_IDs in both file and movie-level boxes, or unique within that set extended with the track_ID of the tracks in a movie box. The item_ID value of 0 should not be used, and shall not be used when the set is extended to include track_IDs.

There are three scopes for item_IDs: file and segments; MovieBox and MovieFragmentBox; and TrackBox and TrackFragmentBox. In other words, there shall be only one item with a given item_ID within a given scope (e.g., in the TrackBox and all TrackFragmentBox with the same track_ID).

The structure or format of the metadata is declared by the handler. In the case that the primary data is identified by a primary item, and that primary item has an item information entry with an item_type, the handler type may be the same as the item_type.

The ItemPropertiesBox enables the association of any item with an ordered set of item properties. Item properties may be regarded as small data records. The ItemPropertiesBox includes two parts: ItemPropertyContainerBox that includes an implicitly indexed list of item properties, and one or more ItemProperty AssociationBox(es) that associate items with item properties. ItemProperty AssociationBox includes a loop of syntax element, where each loop entry corresponds to one item with a given item_ID syntax element and a number of item property associations, each of which comprising a syntax element called essential, which, when set to 1, indicates that the associated property is essential to the item, otherwise it is non-essential, and a property_index syntax element, which is either 0 indicating that no property is associated (in which case the essential indicator is 0), or is the 1-based index (counting all boxes, including FreeSpace boxes) of the associated property box in the ItemPropertyContainerBox included in the same ItemPropertiesBox.

The ISO base media file format does not limit a presentation to be included in one file. As such, a presentation may be comprised within several files. As an example, one file may include the metadata for the whole presentation and may thereby include all the media data to make the presentation self-contained. Other files, when used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. Samples of a chunk and samples of a track fragment may use the same sample entry. A chunk may be defined as a contiguous set of samples for one track. The DataReferenceBox ('dref'), which may also be included in each track, may define an indexed list of data entries, such as uniform resource locators (URLs), uniform resource names (URNs), and/or self-references to the file including the metadata. A sample entry may point to one index of the DataReferenceBox, thereby indicating the file including the samples of the respective chunk or track fragment. Similarly, a DataReferenceBox may be carried in a DataInformationBox of a MetaBox, and an ItemLocationBox includes a data reference index per each item that identifies the container for item data.

DataReferenceBox ('dref' box) includes a list of boxes that declare the potential location(s) of the media data referred to by the file. DataReferenceBox is included by DataInformationBox, which in turn is included by MediaInformationBox or MetaBox. When included in the MediaInformationBox, each sample entry of the track includes a data reference index referring to a list entry of the list of box(es) in the DataReferenceBox. When included in the MetaBox, the ItemLocationBox gives, for each item, the data reference index referring to a list entry of the list of box(es) in the DataReferenceBox. The box(es) in the DataReferenceBox are extended from FullBox, e.g. include the version and the flags field in the box header. As an example, DataReferenceBox may comprise DataEntryUrlBox and DataEntryUrnBox, which provide a uniform resource locator (URL) and a uniform resource name (URN) data reference, respectively. When the least significant bit of the flags field of either DataEntryUrlBox or DataEntryUrnBox is equal 1, the respective data reference refers to the including file itself and no URL or URN string is provided within the DataEntry UrlBox or the DataEntryUrnBox.

A file-level FileTypeBox identifies which specification is the 'best use' of the file (in its major_brand syntax element), a minor version of that specification, and also a set of other specifications to which the file complies (the compatible_ brands syntax element array). The major_brand value should be repeated in the compatible_brands list. Readers should attempt to read files that are marked as compatible with any of the specifications that the reader implements. A file-level FileTypeBox is usually placed early in the file.

In ISOBMFF, the ExtendedTypeBox may be placed after the FileTypeBox, any SegmentTypeBox, or any TrackTypeBox, or used as an item property to indicate that a reader should only process the file, the segment, the track, or the item, respectively, if it supports the processing requirements of all the brands in at least one of the included TypeCombinationBoxes, or at least one brand in the preceding FileTypeBox, SegmentTypeBox, or TrackTypeBox, or in the BrandProperty associated with the same item, respectively. The TypeCombinationBox expresses that the associated file, segment, track, or item may include any boxes or other code points required to be supported in any of the brands listed in the TypeCombinationBox and that the associated file, segment, track, or item complies with the intersection of the constraints of the brands listed in the TypeCombinationBox.

An ISO base media file may have further transformation of its box structure, for example it may use compressed top-level boxes. In this case, the resulting file may no longer be compliant with the brand promises of the original file, as it requires the support for new tools (such as compressed top-level boxes). For example, a file using a compressed MovieBox is no longer compliant to any brand defined prior to the introduction of compressed boxes.

The OriginalFileTypeBox is used to encapsulate brand information applying to the original file before transformation but not valid in the transformed domain. There is at most one OriginalFileTypeBox after each FileTypeBox or SegmentTypeBox. An OriginalFileTypeBox includes the FileTypeBox and, when present, the ExtendedTypeBox, of the file before transformation. In cases where a file uses multiple transformations, nested OriginalFileTypeBox is used, and there is at most one OriginalFileTypeBox in each OriginalFileTypeBox.

The processing model for a file reader is equivalent to reversing the transformation (e.g., decompressing a file with compressed boxes), removing both FileTypeBox/SegmentTypeBox and OriginalFileTypeBox, and inserting in their place the child boxes of the OriginalFileTypeBox. In the case of compressed top-level boxes, the resulting replacement and decompression of the file is a compliant uncompressed ISOBMFF file.

High Efficiency Image File Format (HEIF)

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks. An item in HEIF is defined as the data that does not require timed processing, as opposed to sample data, and is described by the boxes included in a MetaBox.

In the context of HEIF, the following boxes may be included within the root-level 'meta' box and may be used as described in the following. In HEIF, the handler value of the Handler box of the 'meta' box is 'pict'. The resource (whether within the same file, or in an external file identified by a uniform resource identifier) including the coded media data is resolved through the Data Information ('dinf) box, whereas the Item Location ('iloc') box stores the position and sizes of every item within the referenced file. The Item Reference ('iref') box documents relationships between items using typed referencing. When there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items may be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

Predictively coded image items have a decoding dependency to one or more other coded image items. An example for such an image item could be a P frame stored as an image item in a burst entity group that has IPPP . . . structure, with the P frames dependent only on the preceding I frames.

Capability to have predictively coded image items include following example benefits, especially in content re-editing and cover image selection:

- Image sequences can be converted to image items with no transcoding.
- Any sample of an image sequence track can be selected as a cover image. The cover image does not need to be intra-coded.
- Devices that do not have a video or image encoder are capable of updating the cover image of a file including an image sequence track.
- Storage efficiency is further achieved by re-using the predictively coded picture rather than re-encoding it as I frame and storing as an additional image item. Moreover, image quality degradation is also avoided.
- Re-encoding might not be allowed or preferred by the copyright owner. Predictively coded image items avoid the need of re-encoding of any image from an image sequence track.

Predictively coded image items are linked to the coded image items they directly and indirectly depend on by item references of type 'pred'. The list of referenced items in item references of type 'pred' shall indicate the decoding order. When concatenated, the encoded media data of items with item_ID equal to to_item_ID for all values of j from 0 to reference_count−1, inclusive, in increasing order of j, followed by the item with item_ID equal to from_item_ID shall form a bitstream that conforms to the decoder configuration item property of the predictively coded image item.

In order to decode the predictively coded image item, there shall be no other decoding dependencies other than the image items referenced by item references of type 'pred'.

The predictively coded image item shall be associated with exactly one RequiredReferenceTypesProperty including one reference type with the value 'pred'.

A file having the 'pred' brand in the compatible_brands of a TypeCombinationBox associated with the FileTypeBox may include predictively coded image items and shall conform to following constraints:

- When 'mifl' brand is among the compatible brands array of the FileTypeBox then the primary item shall be independently coded. Additionally, an alternate group including this primary item and possibly predictively coded image items may exist.
- It is to be noted that when the 'pred' brand is in the compatible_brands of a TypeCombinationBox associated with the FileTypeBox, and the 'mifl' brand is not among the compatible brands array of the FileTypeBox then the primary item and possibly all items from the alternate group including the primary item can be predictively coded image items
- For each predictively coded image item present in the file, the file shall also include all items that the predictively coded image item depends on (by item references of type 'pred').

The RequiredReferenceTypesProperty descriptive item property lists the item reference types that a reader shall understand and process to decode the associated image item. The respective essential flag shall be equal to 1 in ItemPropertyAssociationBox.

In the absence of this property, required reference types are not explicitly listed, but can still exist.

Syntax of RequiredReferenceTypesProperty is defined as following:

```
aligned(8) class RequiredReferenceTypesProperty
extends ItemFullProperty('rref', version = 0, flags = 0){
  unsigned int(8) reference_type_count;
  for (i=0; i< reference_type_count; i++) {
    unsigned int(32) reference_type[i];
  }
}
```

reference_type_count indicates the number of reference types that are required to understand and process to decode the associated image item.

reference_type [i] indicates a reference type that is required to understand and process to decode the associated image item.

Partial File Format (ISO/IEC 23001-14)

ISO/IEC 23001-14 specifies the Partial File Format, which is a generic format for describing file partially received over lossy communication channels. The partial file format may be used to document reception of files, regardless of their bitstream format. For generic cases, it provides ways for file readers to resynchronize their parsing in case of byte losses. For cases where the documented file derives from ISO/IEC 14496-12, the partial file format provides additional tools, such as an index of the source file structures and data integrity information. ISO/IEC 23001-14 also specifies the MIME type for the Partial File Format.

The Partial File Format includes the specification of BoxFileIndexBox, which provides a summary of the box hierarchy of a box-structured file. It includes a set of BoxIndexBox boxes, each of which describes one top-level box. Each top-level box of the source file will typically have zero or one associated BoxIndexBoxes in the BoxFileIndexBox. A FrontPartBox can be included in a BoxIndexBox. The FrontPartBox provides a selected number of initial bytes of the content of the box identified by the including BoxIndexBox. The fileindex MIME parameter includes one base-64 encoded BoxFileIndexBox, including the box header and contents and including at least one BoxIndexBox. The fileindex parameter may be used with any box-structured file (e.g. ISOBMFF or HEIF file).

The Partial File Format includes the specification of a DataIntegrityBox, which may include one or more DataIntegrityHashBoxes. The DataIntegrityBox may be included in a BoxFileIndexBox or BoxIndexBox. The DataIntegrityHashBox carries cryptographic hash information for a set of boxes or samples. This includes the algorithm used for computing the cryptographic hash, the cryptographic hash itself and which and how boxes are used to produce the cryptographic hash. Three flavors of the data integrity protection are specified, discriminated using the mode field of the DataIntegrityHashBox. A first mode indicates to the reader that the integrity is computed for the indexed box described by the DataIntegrityBox, i.e. for the entire content indexed by the BoxFileIndexBox or the BoxIndexBox that includes the DataIntegrityBox. A second mode indicates to the reader that the integrity is computed for child boxes of the indexed box described by the DataIntegrityBox. A third mode indicates that integrity is computed from certain samples or sample information, as further indicated in the DataIntegrityHashBox.

An Example Problem

Figure 3:
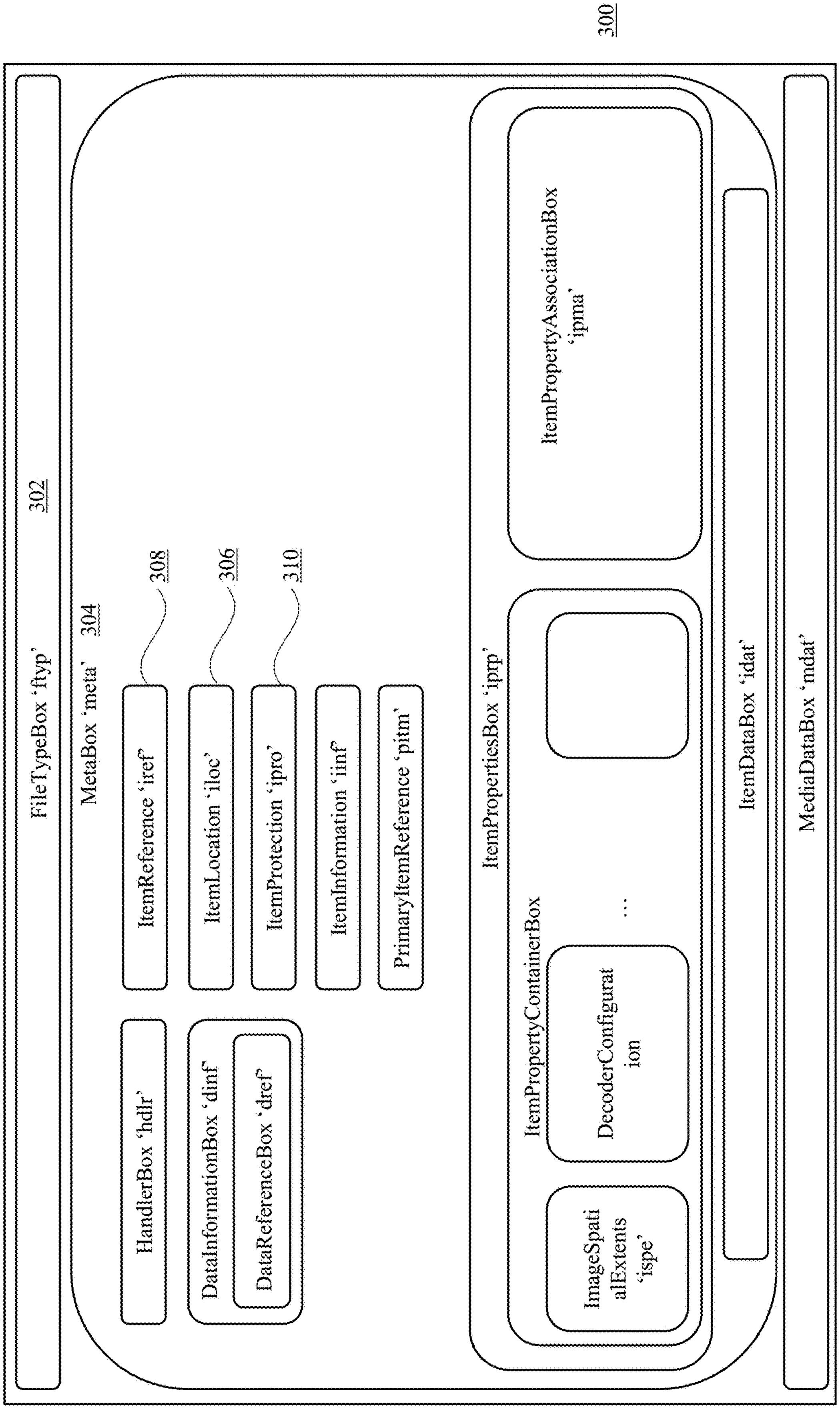
FIG. 3 shows an example of high efficiency image file (HEIF) image file.

For encapsulating images, the metadata required for describing the content is quite significant in HEIF. When small and very small images are considered, in some cases the metadata size could be appreciable against the size of the image itself. For example, web content includes JPGs or portable network graphics (PNGs) that are small (e.g., on the order of 32×32), for example, where the size of the metadata is in the range of 600-700 bytes whereas the size of the image data may be in the range of 200-300 bytes. An example of HEIF image file 300 is shown in FIG. 3. The image file 300 includes the mandatory FileTypeBox 302 followed by the file-level MetaBox 304 which carries the data related to image items, for example, an item location 306, an item protection 308, an item references 310, and several other boxes related to the type of item. For example, when it includes an image encoded with HEVC then the image related decoder configuration and other properties are also stored in the file. As it can be seen the size of the metadata related to an image item could be very significant especially when the size of the image data itself is very small. So, as an example, there is a need to reduce the overhead of metadata needed for encapsulating smaller images to make the processing of such images lightweight.

Another Example Problem

Figure 4:
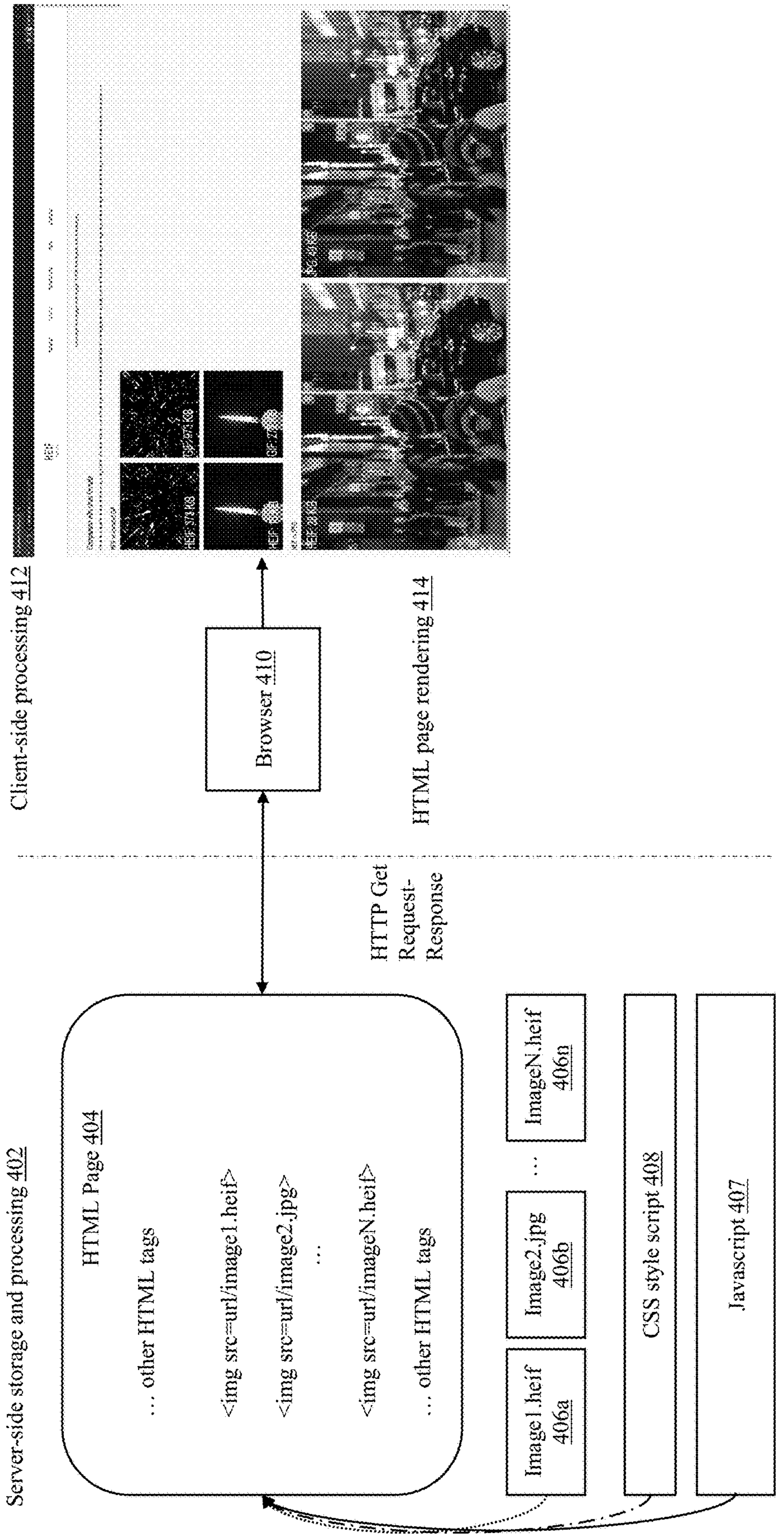
FIG. 4 shows an example webpage in which images used in the webpage are stored in separately in a server.

Certain markup language, e.g., HyperText Markup Language (HTML), pages may use multiple images to be rendered as part of their web page content. Usually, images used in the web pages are stored in the server separately. An example of such a web page is shown in FIG. 4. As seen in FIG. 4, the server 402, which hosts the webpage, stores the HTML web page 404 together with images 406 to 406*n*, to be used in the web page 404 along with the related Javascript 407 and CSS style pages 408. A browser 410 at the client end 412 downloads the HTML page 404 together with all the related images 406*a* to 406*n*, Javascript, 407 and CSS style pages 408 which are then rendered 414 on the client device. However, many of the images may share a common initialization information (except may be the resolution); due to independent storage the data required for storage and transmission increases with the number of images to be rendered in the web page. Accordingly, for example, there is a need to reduce the overhead of metadata needed for storage and transmission of images sharing common initialization information in web pages. It is to be understood that even though the example is described in relation to web pages, it applies similarly to any collection of image content where many of the images share a common initialization information.

In the following paragraphs the terms reduced header mode, compact metadata, or compressed metadata are used interchangeably and are to be considered as alternatives of each other.

Reduced Header Mode

In various embodiments, a file includes a reduced header or a reduced metadata that is used for processing the media data of items included in the file.

An example method includes:

writing in a container file:

- the indication of presence of a reduced header mode or compact metadata; and
- the reduced header including information for processing the item(s).

Another example method includes:

receiving and parsing a file comprising:

- the indication of presence of a reduced header mode or compact metadata; and
- the reduced header including information for processing the item(s); and processing the reduced header data to extract information needed for the decoding of the item.

Processing HTML with Multiple Images (Items)

In various embodiments, a container file includes multiple items together with common initialization information of the included items. The item data and the initialization data are present in such a way that the item data and the initialization data can be accessed separately from each other, while having a reference between them. An HTML page includes information to access the common initialization information together with information for accessing the items independently. The common initialization information and the item data within the HTML are referenced using keywords or variables. The container file carries the mapping from the keywords or variables within the HTML to items and the common initialization information.

An example method includes:

writing in a container file:

- a common initialization information shared between two or more item(s);
- the data (including media and metadata) of the two or more item(s); and
- information about the mapping from the keywords or variables within the html to items and the common initialization information; and creating a html including:

- information to access the common initialization information together with information for accessing the items independently; and
- the common initialization information and the item data within the html referenced using keywords or variables.

Another example method includes:

receiving and parsing a html including:

- information to access the common initialization information together with information for accessing the items independently; and
- the common initialization information and the item data within the html referenced using keywords or variables;

requesting the common initialization information;

receiving and parsing a file including:

- a common initialization information shared between two or more item(s); and information about the mapping from the keywords or variables within the html to items and the common initialization information;

requesting the item data based on the parsed common initialization information;

receiving and parsing a file including the data (including media and metadata) of the two or more item(s).

An Entity for Processing HTML with Multiple-Images (Items)

In various embodiment, a HTML page includes multiple items (images), and an entity identifies items with same metadata information (e.g., MetaBox 'meta'). An entity modifies the items, for example, by: modifying the type of the item to indicate the reduced header mode, creating external common initialization information (e.g., data including the MetaBox 'meta'), and replacing the metadata information with FileDescriptionBox that provide information on how and/or where to access the external common initialization information (e.g., by using CommonMetaLocationBox, defined in some of the following paragraphs).

One of the example benefits of this approach is reduced amount of data that needs to be fetched by a client. For example, when common initialization data would be provided through HTTP uniform resource locator (URL), the data would be downloaded only once regardless of the amount of the items on the webpage, as every item would reuse the cached resources.

Further Explanation on Reduced Header Mode

In an embodiment, a container file may include only the reduced header mode.

In an embodiment, the indication of presence of a reduced header mode may be indicated in the FileTypeBox).

In an embodiment, the indication of presence of a reduced header mode may be indicated in the OriginalFileTypeBox.

In an embodiment, the indication of presence of a reduced header mode may be indicated at a level prior to the reduced header mode (boxes).

In an embodiment, the indication of presence, usage or support of a reduced header mode may be done at a higher protocol level communication, for example (but not limited to) using HTTP request/response header fields.

In an alternate embodiment, a container file may include both the reduced header mode and the normal header mode. The normal header mode is the mode currently supported in HEIF.

In an embodiment, to indicate the presence of both reduced header mode and normal mode in a file, a new box called the file description box may be defined.

In an embodiment, a file description box is present at the file-level immediately following FileTypeBox, ExtendedTypeBox, or OriginalFileTypeBox when present; or SegmentTypeBox, with at most an ExtendedTypeBox and/or FreeSpaceBox(es) in between.

In an embodiment, a file description box is present in the ExtendedTypeBox or in the OriginalFileTypeBox, when the OriginalFileTypeBox is present.

In an embodiment, a file description box carries information which allows the file to be processed in different ways. One example for such a use is to allow the file to be used in both reduced header mode and normal mode.

In an alternate embodiment, the OriginalFileTypeBox may be extended, as following, to indicate the byte range/offsets to be used for processing the file in reduced header mode and normal mode:

```
aligned(8) class FileDescriptionBox extends Box('fdes') {
}
```

In an embodiment, a reduced header mode being indicated in a FileTypeBox,

ExtendedTypeBox, or OriginalFileTypeBox imposes certain constraints, such as one or more of the following:

the box order of the file may be subject to specific constraints, such as the MediaDataBox may be required to precede the file-level MetaBox;

the item count may be limited, e.g., to one image item;

IdentifiedMediaDataBox(es) is to be used instead of MediaDataBox(es) so as to make rearranging file-level boxes within a file easier;

the item count per IdentifiedMediaDataBox or MediaDataBox may be constrained to be equal to 1, the number of extents per item may be limited to be equal to 1, and all the bytes in a IdentifiedMediaDataBox or MediaDataBox belong to a single item; or when multiple IdentifiedMediaDataBoxes or MediaDataBoxes are present and each of them includes one image item only, their order may be constrained according to the role or characteristics of the image item (e.g., the first box may include the primary item and the second box, when present, may include an alpha plane).

In an embodiment, the common initialization data among a set of image items to be stored in a different file. The CommonMetaLocationBox provides the URL for accessing the common initialization data among a set of image items. The CommonMetaLocationBox may be included in the FileDescriptionBox or the MetaBox or any other file-level boxes.

Use and Signalling of the FileDescriptionBox

In an embodiment, a file writer includes in a FileDescriptionBox (directly within the FileDescriptionBox or indirectly in a child box of a FileDescriptionBox) one or more hash values that are derived from pre-defined or indicated boxes, and/or syntax structures, and/or syntax elements. For example, a file writer may include a hash value of the file-level MetaBox in a FileDescriptionBox.

In an embodiment, a file reader obtains at least a FileDescriptionBox of a first file and parses from the FileDescriptionBox (directly from the FileDescriptionBox or indirectly from a child box of a FileDescriptionBox) one or more first hash values that have been derived from pre-defined or indicated boxes, and/or syntax structures, and/or syntax elements. For example, a file reader may parse a first hash value of the file-level MetaBox from a FileDescriptionBox. The file reader derives and parses one or more second hash values from a second file that is available for the file reader. When a first hash value matches with the second hash value, the file reader uses the data of the second file to process the first file. For example, when the hash value of file-level MetaBox of the second file is equal to the hash value of the file-level MetaBox of the first file, the file reader uses the file-level MetaBox of the second file to process the item data of the first file. A client may omit downloading at least some of the data of the first file that corresponds to the respective boxes, and/or syntax structures, and/or syntax elements of the first hash value.

In an embodiment, an optional MIME parameter is defined that is indicative of the information of a FileDescriptionBox. For example, a filedescr MIME parameter may be defined that includes a base64 representation of the FileDescriptionBox (potentially excluding the boxtype 4CC).

In an embodiment, a web page creator includes the MIME type, including the filedescr MIME parameter, to characterize a file, for example, in a type attribute used in a source element of a HEIF file.

In an embodiment, a web browser reads the MIME type, including the filedescr MIME parameter, that characterizes a file. Then, the web browser performs one or more embodiments described for a file reader with the information of the filedescr MIME parameter rather than of the FileDescriptionBox.

In an embodiment, a web page creator includes the fileindex parameter, specified in ISO/IEC 23001-14 and incorporated herein by reference, to characterize the file. The fileindex parameter may comprise hash values of one or more boxes and/or box sizes of one or more boxes.

In an additional embodiment, a web browser reads the fileindex parameter that characterizes the file. According to one or more embodiments, the web browser determines which boxes and/or syntax structures and/or syntax elements are downloaded and/or omitted from downloading. The web browser determines byte range(s) to be downloaded based on the fileindex parameter and the boxes and/or syntax structures and/or syntax elements are downloaded and/or omitted from downloading. The web browser issues one or more requests to download the determined byte range(s).

In an embodiment, a file writer includes, in a FileDescriptionBox (directly within the FileDescriptionBox or indirectly in a child box of a FileDescriptionBox) or alike, information characterizing the item(s). The information may comprise, but may not be limited to, one or more of the following: handler type, item type, decoder configuration item, MIME type. This information is sufficient to select and initialize a decoder to decode an item.

In an embodiment, a file reader parses, from a FileDescriptionBox (directly within the FileDescriptionBox or indirectly in a child box of a FileDescriptionBox) or alike, information characterizing the item(s). The file reader identifies the item data for one or more items from one or more IdentifiedMediaDataBoxes or MediaDataBoxes. For example, the file reader concludes, e.g., from an indicated brand, that the file has been constrained so that the item count per IdentifiedMediaDataBox or MediaDataBox is equal to 1, the number of extents per item is equal to 1, and all the bytes in a IdentifiedMediaDataBox or MediaDataBox belong to a single item. The file reader then selects and initializes a decoder based on the information characterizing the item(s) and invokes the decoding of the identified item data.

In an embodiment, a file writer includes, in an IdentifiedMediaDataBox or MediaDataBox, information characterizing the item(s) included in the box. The information characterizing the item(s) may be located at a pre-defined position within the box (e.g., at the beginning) and may have a pre-defined length or may be enclosed in a length-prefixed structure, such as a box. The information may comprise, but may not be limited to, one or more of the following: handler type, item type, decoder configuration item, MIME type. This information is sufficient to select and initialize a decoder to decode an item. The presence of the information characterizing item(s) included in an IdentifiedMediaDataBox or MediaDataBox may be indicated, e.g., by a brand in a FileTypeBox, ExtendedTypeBox, or OriginalFileTypeBox.

In an embodiment, a file reader concludes that an IdentifiedMediaDataBox or MediaDataBox comprises information characterizing the item(s) included in the box. For example, the file reader may parse a brand from a FileTypeBox, ExtendedTypeBox, or OriginalFileTypeBox that indicates that the information characterizing item(s) is included in an IdentifiedMediaDataBox or MediaDataBox. The file reader parses, from an IdentifiedMediaDataBox or MediaDataBox, information characterizing the item(s). The file reader identifies the item data for one or more items from one or more IdentifiedMediaDataBoxes or MediaDataBoxes. For example, the file reader concludes, e.g., from an indicated brand, that the file has been constrained so that the item count per IdentifiedMediaDataBox or MediaDataBox is equal to 1, the number of extents per item is equal to 1, and all the bytes in a IdentifiedMediaDataBox or MediaDataBox belong to a single item. The file reader then selects and initializes a decoder based on the information characterizing the item(s) and invokes the decoding of the identified item data.

Extend MetaBox or Compact Meta Box

In an embodiment, the file-level MetaBox is extended to indicate the reduced header mode. The extension may be signalled by using a new version of the MetaBox or alternatively the extension may be using the flags of the MetaBox structure.

In an embodiment, a new box at the file-level is defined called the CompactMetaBox. The presence of CompactMetaBox at the file-level indicates the reduced header mode. One or more features of the following CompactMetaBox syntax may be applied in embodiments:

```
aligned(8) class CompactMetaBox (handler_type)
extends FullBox('cmet', version = 0, 0) {
HandlerBox(handler_type)   theHandler;
// only those boxes required for describing the image item
Box   other_boxes[ ];                         // optional
}
```

In an embodiment, a CompactMetaBox comprises information indicative of the type(s) of compaction that have been applied. For example, the information may be indicative of which reduced header mode constraints have been obeyed. In one embodiment, the information may comprise a list of brands, for example carried in an ExtendedTypeBox within the CompactMetaBox. One or more aspects of the following CompactMetaBox syntax may be applied in embodiments.

```
aligned(8) class CompactMetaBox (handler_type)
extends FullBox('cmet', version = 0, 0) {
ExtendedTypeBox            compaction_brands;   // mandatory
HandlerBox(handler_type)   theHandler;          // optional
// only those boxes required for describing the image item
Box                        other_boxes[ ];      // optional
}
```

In an embodiment, a file reader parses a CompactMetaBox like a MetaBox but additionally including pre-defined information in the CompactMetaBox in addition to information indicated in the CompactMetaBox. For example, certain item properties may be pre-defined and added for the parsing of the CompactMetaBox.

In an embodiment, there may be multiple sets of predefined information, out of which a file writer indicates one set to be used for the parsing of the CompactMetaBox. The indication may be, for example, a particular brand indicated in a FileTypeBox, ExtendedTypeBox, or OriginalFileType- Box. The indication may be sufficient, for example, to select and initialize a decoder for decoded the item data.

In an embodiment, there may be multiple sets of pre-defined information, out of which a file writer indicates one set to be used for the parsing of the CompactMetaBox. The indication is indicative of i) CompactMetaBox being present instead of or in addition to MetaBox, and ii) constraints of the reduced header mode being obeyed in the file, as described in other embodiment(s). The indication may be, for example, a particular brand indicated in a FileTypeBox. An OriginalFileTypeBox may be included and includes the brand(s) that would apply when a MetaBox is constructed from the CompactMetaBox and the known constraints obeyed in the reduced header mode. Furthermore, the OriginalFileTypeBox may, for example, include codec-specific brands that may indicate the coding format obeyed in the item(s) included in the file. The information carried in the FileTypeBox and the OriginalFileTypeBox may be sufficient, for example, to select and initialize a decoder for decoded the item data.

In an embodiment, a file writer obeys pre-defined constraints associated the file-level MetaBox or a brand (e.g., in a FileTypeBox or ExtendedTypeBox) indicating the reduced header mode. The pre-defined constraints may comprise, but may not be limited to, one or more of the following:

The file shall include one and only one MediaDataBox or IdentifiedMediaDataBox per each item.

The file shall not include MediaDataBox(es) or IdentifiedMediaDataBox(es) that include data other than item data.

The order of MediaDataBox(es) and IdentifiedMediaDataBox(es) in the file shall be in ascending order of item IDs.

The item data for the primary item shall be present in the first MediaDataBox (when present) or IdentifiedMediaDataBox (when present), whichever is earlier in the file.

Each item shall have only one extent.

There shall be no other data than the item data in the MediaDataBox or IdentifiedMediaDataBox.

In an embodiment, a file writer obeys the above listed constraints and omits writing an ItemLocationBox in the file.

In an embodiment, a file reader parses from the file-level MetaBox or a brand (e.g., in a FileTypeBox or ExtendedTypeBox) that the reduced header mode is in use in the file. The file reader uses pre-defined constraints associated with the reduced header mode to locate item data for the items: as follows:

The list of item ID values in ascending order is obtained from the ItemInfoBox.

The item data for the first item in the list of item ID values is located the first MediaDataBox (when present) or IdentifiedMediaDataBox (when present), whichever is earlier in the file. Item data for each subsequent item in the list of item ID values is resolved to be the box payload of the next MediaDataBox or IdentifiedMediaDataBox in file order.

In an embodiment, a file modifier receives a file that includes a CompactMetaBox and generates a MetaBox from the CompactMetaBox by additionally including the pre-defined information into the MetaBox as described above. The file modifier writes the modified file into a file system or provides it to a legacy file reader that is not aware of the CompactMetaBox.

Compression of Boxes

In an embodiment, the MetaBox present at the file-level is compressed based on the compressed box definition of ISO/IEC 14996-12 and is incorporated herein by reference.

In an embodiment, a CompressedMetaBox is defined which includes the compressed version of a file-level MetaBox BoxPayload. The replacement type of the CompressedMetaBox is ‘meta’.

Figure 5:
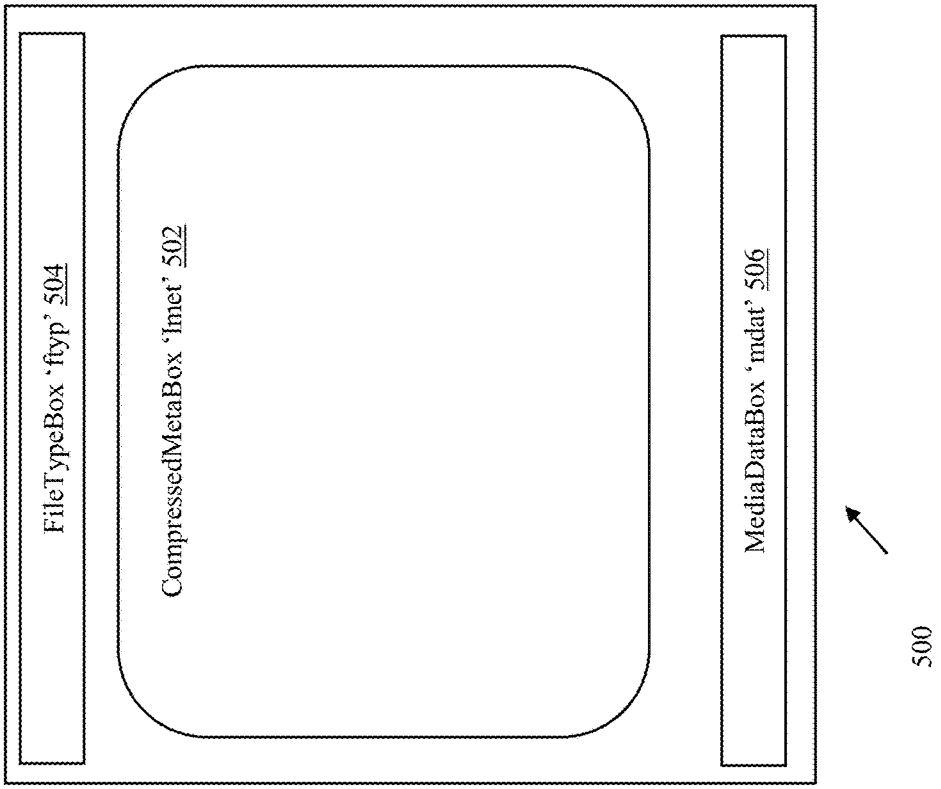
FIG. 5 illustrates an example HEIF file with a CompressedMetaBox.

FIG. 5 illustrates an example HEIF file 500 with a CompressedMetaBox 502. The file 500 includes the FileTypeBox 504, the CompressedMetaBox 502 at the file-level and the MediaDataBoxes 506, if any.

In an embodiment, both a CompressedMetaBox and a MetaBox can be present at the file-level to support both reduced header mode and normal mode processing of items.

In an alternate embodiment only one of the CompressedMetaBox or the MetaBox may be present at the file-level. An example CompressedMetaBox is defined below:

```
aligned(8) class CompressedMetaBox
extends CompressedBox(‘!met’, ‘meta’) {
}
```

In an embodiment, when the CompressedMetaBox is used at the file-level the ItemData may not be present as part of the BoxPayload of the MetaBox at the file-level, all the Item data of the metadata items that use the construction method indicating that an item's data extents are stored within is present in the MediaDataBox present at the file-level.

Compact Item Header Box

In an embodiment, a new compact item header box is defined called the Compactitemheaderbox (alternatively any other name may be used for example compactheaderbox). The CompactItemHeaderBox is present in the MetaBox.

In an embodiment, the MetaBox is extended to indicate the presence of CompactItemHeaderBox. The extension may be signalled by using a new version of the MetaBox or alternatively the extension may be using the flags of the MetaBox structure.

In an embodiment, the MetaBox including the CompactItemHeaderBox also includes the mandatory HandlerBox with a specific handler_type (for example handler_type=pict).

Figure 6:
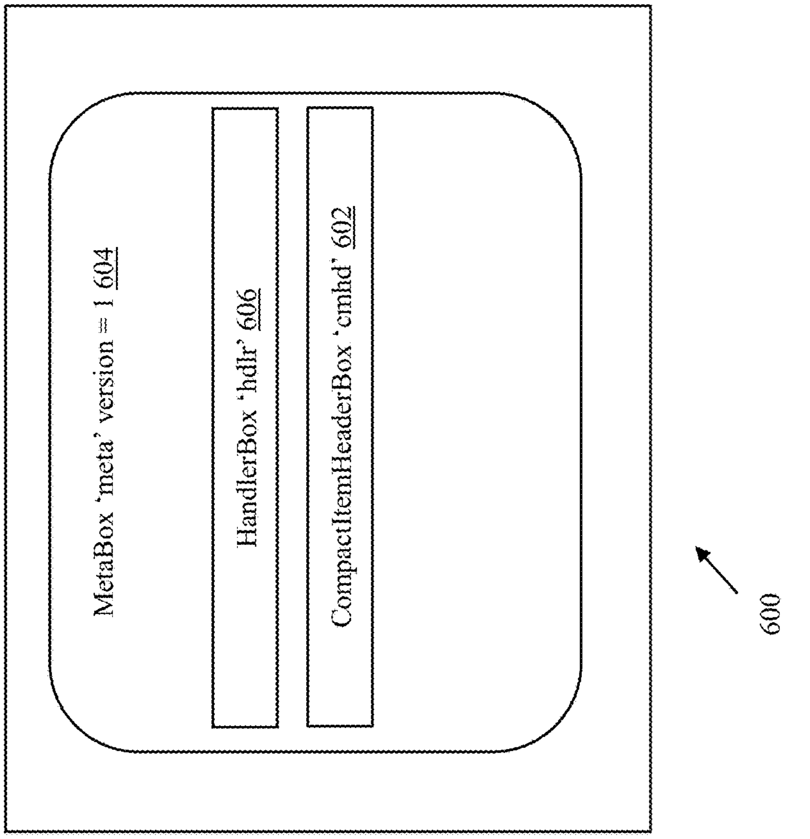
FIG. 6 illustrates an example HEIF file with a CompactItemHeaderBox.

FIG. 6 illustrates an example HEIF file 600 with a CompactItemHeaderBox 602. In FIG. 6, the CompactItemHeaderbox 602 is present in a MetaBox 604, for example, a file-level Metabox. The MetaBox 604 includes only the mandatory HandlerBox 606 together with the CompactItemheaderBox 602.

In an embodiment, following boxes are allowed to be used for indicating the items to be included in the CompactItemHeaderBox in any order:

PrimaryItemBox;

DataInformationBox;

ItemLocationBox;

ItemProtectionBox;

ItemInfoBox;

IPMPControlBox;

ItemReferenceBox;

ItemPropertiesBox;

XML container;

binaryXMLContainer; or

FileDeliveryItemInfo.

The boxes included are then compressed with deflate ( ) as defined in IETF request for comments (RPC) 1951 and forms the BoxPayload of the CompactHeaderBox.

The CompactItemHeaderBox may not include the ItemDataBox carrying the data of the metadata items.

The MetaBox including the CompactItemHeaderBox also includes the ItemDataBox to carry the data of metadata items.

```
aligned(8) class MetaBox (handler_type)
extends FullBox('meta', version, 0) {
  HandlerBox(handler_type)       theHandler;
  if (version==0){
    PrimaryItemBox              primary_resource;        // optional
    DataInformationBox          file_locations;          // optional
    ItemLocationBox             item_locations;          // optional
    ItemProtectionBox           protections;             // optional
    ItemInfoBox                 item_infos;              //
  optional
    IPMPControlBox              IPMP_control;            // optional
    ItemReferenceBox            item_refs;
    // optional
    ItemDataBox                 item_data;
    // optional
    Box other_boxes[ ];
    // optional
  }
  if (version==1){
    CompactItemHeaderBox        compact_item_header;
    ItemDataBox                 item_data;
    // optional
  }
}
aligned(8) class CompactItemHeaderBox extends
FullBox('cmhd', version = 0, 0) {
  bit(8) compressed_data[ ];// to end of box
}
```

compressed_data is the compressed payload after the concatenation of any of the following boxes in any order:

PrimaryItemBox;
DataInformationBox;
ItemLocationBox;
ItemProtectionBox;
ItemInfoBox;
IPMPControlBox;
ItemReferenceBox;
ItemProperties;
XML container;
binaryXMLContainer; or
FileDeliveryItemInfo.

A reader which receives a file having the file-level MetaBox including the CompactHeaderBox may perform the following:

- the BoxPayload of the CompactItemHeaderBox is decompressed to obtain a datastream of Boxes;
- the reader parses the datastream of boxes like any ISOBMFF box or full box; and
- the reader shall reconstruct the MetaBox at the file-level by replacing the CompactHeaderBox with the boxes output after decompressing the BoxPayload of the CompactHeaderBox Compact Item Header Box Related Constraints In an embodiment, when the MetaBox supports reduced header mode, the MetaBox may include only the mandatory HandlerBox with a specific handler_type and the CompactItemHeaderBox. In an embodiment, this indicates that all the items represented by the MetaBox is defined in reduced header mode.

In an alternate embodiment, when the MetaBox supports reduced header mode, the MetaBox may include all the boxes currently supported in version=0 (PrimaryItemBox; DataInformationBox; ItemLocationBox; ItemProtectionBox; ItemInfoBox; IPMPControlBox; ItemReferenceBox; ItemProperties; XML container; binaryXMLContainer; FileDeliveryItemInfo; ItemDataBox), together with the CompactItemHeaderBox. In an embodiment, this indicates that a subset of items represented by the MetaBox is defined in reduced header mode and the remaining subset of items represented by the MetaBox is defined in normal header mode.

In an embodiment, a file may include a Metabox which only represents one or more items in the reduced header mode and another MetaBox in the file which only represents one or more items in the normal header mode.

In an embodiment, the CompactItemHeaderBox may optionally include the following boxes in any order PrimaryItemBox; DataInformationBox; ItemLocationBox; ItemProtectionBox; ItemInfoBox; IPMPControlBox; ItemReferenceBox; ItemProperties; XML container; binaryXMLContainer; FileDeliveryItemInfo; ItemDataBox.

In an alternate embodiment, the following boxes are allowed to be present in the Compactitemheaderbox PrimaryItemBox; DataInformationBox; ItemLocationBox; ItemProtectionBox; ItemInfoBox; IPMPControlBox; ItemReferenceBox; ItemProperties; XML container; binaryXMLContainer; FileDeliveryItemInfo; ItemDataBox.

In an embodiment, the reduced header mode may support representation of only a single item and/or a single image item.

In another embodiment, the reduced header mode may support representation of only a single item and/or a single image item together with an auxiliary image item (for example alpha channel in auxiliary image item).

In an embodiment, the reduced header mode may support representation of multiple items and/or multiple image items.

In an embodiment, when the reduced header mode supports representation of only a single image item, the CompactItemHeaderBox may include the PrimaryItemBox indicating that the single image item is the primary item.

In an embodiment, when the reduced header mode supports representation of only a single image item, the CompactItemHeaderBox may not include the PrimaryItemBox. In the absence of PrimaryItemBox the primary item is concluded to be the single image item represented in the CompactItemHeaderBox. The item_ID of the primary item may be concluded either by the item_ID value of the ItemLocationBox, if present, or by the item_ID value of the ItemLocationBox, if present or by the item_ID value of the ItemInfoBox, if present, or by the item_ID value of the ItemProperty AssociationBox, if present or in absence of all these boxes, the item_ID value is concluded to be equal to 1.

In an embodiment, when the reduced header mode supports representation of only a single item and/or a single image item together with an auxiliary image item, the CompactItemHeaderBox may include the PrimaryItemBox indicating the image item that is the primary item.

In an embodiment, when the reduced header mode supports representation of only a single item and/or a single image item together with an auxiliary image item, the CompactItemHeaderBox may not include the PrimaryItemBox. In the absence of PrimaryItemBox the item_ID of the primary item is concluded to be either the image item with the lowest item_ID among the two image items represented by the reduced header mode or the item_ID of the image item which does not have any AuxiliaryTypeProperty associated with it.

In an embodiment, when the reduced header mode supports representation of multiple items and/or multiple image items, the CompactItemHeaderBox may include the PrimaryItemBox indicating the image item that is the primary item.

In an embodiment, when the reduced header mode supports representation of multiple items and/or multiple image items, the CompactItemHeaderBox may not include the PrimaryItemBox. In the absence of PrimaryItemBox the item_ID of the primary item is concluded to be the item_ID of the image item with the lowest item_ID among all the image items represented by the reduced header mode.

In an embodiment, when the reduced header mode supports representation of multiple items and/or multiple image items, the CompactItemHeaderBox may not include the PrimaryItemBox. In the absence of PrimaryItemBox the item_ID of the primary item is concluded to be the item_ID of the image item with the highest item_ID among all the image items represented by the reduced header mode.

In an embodiment, the CompactItemHeaderBox may include the ItemLocationBox indicating a directory of resources in this or other files, by locating their container, their offset within that container, and their length.

In an embodiment, the CompactItemHeaderBox may include the DataInformationBox when it also includes the ItemLocationBox and the construction_method=0 and the data_reference_index>0.

In an embodiment, when the reduced header mode supports representation of only a single image item, the CompactItemHeaderBox may not include the ItemLocationBox. In the absence of ItemLocationBox, the following is concluded:

- the item has one and only one extent,
- construction_method=0
- the item data is constrained to be present in the same file (data_reference_index==0),
- the item data is either present in the MediaDataBox ('mdat'), if ItemDataBox is not included in the CompactItemHeaderBox. The file shall include one and only one MediaDataBox, the item data for the item shall be present in the MediaDataBox, and there shall be no other data than the item data in the MediaDataBox. or
- the item data is present in the IdentifiedMediaDataBox (imda), if ItemDataBox is not included in the CompactItemHeaderBox, with the imda_identifier equal to item_ID of the item represented by CompactItemHeaderBox; there shall be no other data than the item data in the IdentifiedMediaDataBox In an alternate embodiment, when the reduced header mode supports representation of only a single image item, the CompactItemHeaderBox may not include the ItemLocationBox. In the absence of ItemLocationBox, the following is concluded:

- the item has one and only one extent,
- construction_method=1
- the item data is present in the ItemDataBox included in the CompactItemHeaderBox, and there shall be no other data than the item data in the ItemDataBox In an embodiment, when the reduced header mode supports representation of only a single image item, the CompactItemHeaderBox may not include the ItemLocationBox. In the absence of ItemLocationBox, the following is concluded:

- the item has one and only one extent, If a DataInformationBox is included in the CompactItemHeaderBox including a DataReferenceBox with only one entry
- construction_method=0
- the item data is constrained to be present as indicated by the first entry in the DataReferencebox (data_reference_index=1), with offsets and length to be equal to zero.

In an embodiment, when the reduced header mode supports representation of only a single item and/or a single image item together with an auxiliary image item, the CompactItemHeaderBox may not include the ItemLocationBox. In the absence of ItemLocationBox, the following is concluded:

- the items have one and only one extent,
- construction_method=1
- two ItemDataBoxes included in the CompactItemHeaderBox
- the item data is present in their own ItemDataBox included in the CompactItemHeaderBox, and there shall be no other data than the item data in the ItemDataBoxes
- the first ItemDataBox included in the CompactItemHeaderBox belonging to the single image item
- the second ItemDataBox included in the CompactItemHeaderBox belonging to the auxilary image item In an embodiment, when the reduced header mode supports representation of only a single item and/or a single image item together with an auxiliary image item, the CompactItemHeaderBox may not include the ItemLocationBox. In the absence of ItemLocationBox, the following is concluded:

- the items have one and only one extent,
- construction_method=0
- the item data is constrained to be present in the same file (data_reference_index==0),
- two MediaDataBoxes included in the file
- the item data is either present in their own MediaDataBox ('mdat'). The item data for the item shall be present in the MediaDataBox, and there shall be no other data than the item data in the MediaDataBox.
- the first MediaDataBox included in the file belonging to the single image item
- the second MediaDataBox included in the file belonging to the auxilary image item or
- the item data is present in their own IdentifiedMediaDataBox (imda, with the imda_identifier equal to the respective item_ID of the item represented by CompactItemHeaderBox; there shall be no other data than the item data in the IdentifiedMediaDataBoxes In an embodiment, when the reduced header mode supports representation of only a single item and/or a single image item together with an auxiliary image item, the CompactItemHeaderBox may not include the ItemLocationBox. In the absence of ItemLocationBox, the following is concluded:

- the items have one and only one extent,

If a DataInformationBox is included in the CompactItemHeaderBox including a DataReferenceBox with only two entries

- construction_method=0
- the single image item data is constrained to be present as indicated by the first entry in the DataReferencebox (data_reference_index=1), with offsets and length to be equal to zero.
- the auxiliary item data is constrained to be present as indicated by the second entry in the DataReferencebox (data_reference_index=2), with offsets and length to be equal to zero.

In an embodiment, when the reduced header mode supports representation of multiple items and/or multiple image items, the CompactItemHeaderBox may not include the ItemLocationBox. In the absence of ItemLocationBox, the following is concluded:

the items have one and only one extent, construction_method=1 the number of ItemDataBoxes included in the CompactItemHeaderBox is equal to the number of items represented in the CompactItemHeaderBox the item data is present in their own ItemDataBox included in the CompactItemHeaderBox, and there shall be no other data than the item data in the ItemDataBoxes the ItemDataBoxes included in the CompactItemHeaderBox belong to respective items in increasing order of item_IDs.

In an alternate embodiment, the ItemDataBoxes included in the CompactItemHeaderBox belong to respective items in decreasing order of item_IDs.

In an embodiment, when the reduced header mode supports representation of multiple items and/or multiple image items, the CompactItemHeaderBox may not include the ItemLocationBox. In the absence of ItemLocationBox, the following is concluded:

the items have one and only one extent, construction_method=0 the item data is constrained to be present in the same file (data_reference_index=0), the item data is either present in their own MediaDataBox ('mdat'). The item data for the item shall be present in the MediaDataBox, and there shall be no other data than the item data in the MediaDataBox.

the number of MediaDataBoxes included in the file CompactItemHeaderBox is equal to the number of items represented in the CompactItemHeaderBox the MediaDataBoxes included in the file belong to respective items in increasing order of item_IDs.

In an alternate embodiment, the MediaDataBoxes included in the file belong to respective items in decreasing order of item_IDs. or the item data is present in their own IdentifiedMediaDataBox (imda, with the imda_identifier equal to the respective item_ID of the item represented by CompactItemHeaderBox; there shall be no other data than the item data in the IdentifiedMediaDataBoxes In an embodiment, when the reduced header mode supports representation of multiple items and/or multiple image items, the CompactItemHeaderBox may not include the ItemLocationBox. In the absence of ItemLocationBox, the following is concluded:

the items have one and only one extent,

If a DataInformationBox is included in the CompactItemHeaderBox including a DataReferenceBox with number of entries equal to number of items represented by the CompactItemHeaderBox construction_method=0 the item data is constrained to be present as indicated by the entries in the DataReferencebox, with offsets and length to be equal to zero.

the entries in the DataReferencebox belong to respective items in increasing order of item_IDs In an alternate embodiment, the entries in the DataReferencebox belong to respective items in decreasing order of item_IDs In an embodiment, when the reduced header mode supports representation of only a single item and/or a single image item together with an auxiliary image item, the CompactItemHeaderBox may not include the ItemReferenceBox. In the absence of ItemReferenceBox, an item reference of 'auxl' from the auxiliary item to the image item is concluded. An item reference box is reconstructed with the referenceType='auxl' from_item_ID set to the item_ID of the auxiliary image item, with reference_count set 1 and to_item_ID set to the item_ID of the single image item.

In an embodiment, when the reduced header mode supports representation of only a single image item, the ItemPropertiesBox in CompactItemHeaderBox may not include the ItemPropertyAssociationBox in such a case it is concluded that all the item properties present in the ItemPropertyContainerBox belong to the single image item represented by the CompactItemHeaderBox.

Compact Representation or Tightly Packed Representation

In an embodiment, in the reduced header mode an image is stored as an item of item_type value 'mime' and content type starting with 'image' also called as a MIME type image item. The body of the item may be a valid image (either an independently decodable image or a predictively coded image). The content_type in ItemInfoEntry of the ItemInfoBox is set equal to the MIME type of the data in the item. Example values for content_type field may include 'image/jpeg' for joint photographic experts group (JPEG) images. A MIME type image item may be used to avoid including or pre-defining decoder configuration information, since the bitstream of the MIME type image item is independent and does not require any configuration information stored as metadata.

In an embodiment, the MIME type image item is associated with item properties which are required for its rendering. For example, ImageSpatialExtentsProperty which documents the visually rendered width and height of the image which is output from the MIME type image item.

A reduced header mode image brand is defined to specify further constraints to the reduced header mode.

In an embodiment, the flags field of ItemInfoEntry may be indicative of the item being self-contained in a manner that it does not require any configuration information stored as metadata for decoding. For example, for an item that includes one or more length-prefixed NAL units, the number of bytes used to represent the length may be indicated in the flags field of ItemInfoEntry, thus the decoder configuration item property is not needed for deriving the byte count of the length.

Share MetaBox between Multiple Files

In one embodiment, a MetaBoxLocationBox may be defined, which indicates a location of MetaBox of the item, e.g., a URL path. The MetaBoxLocationBox may be defined as following:

```
aligned(8) class MetaBoxLocationBox
   extends FullBox('metl', 0, 0) {
   utf8string location;
}
```

location from MetaBoxLocationBox indicates for example an URL under which MetaBox data can be fetched by a reader.

In an embodiment, a file writer includes in a FileDescriptionBox (directly within the FileDescriptionBox or indirectly in a child box of a FileDescriptionBox) one or more MetaBoxLocationBox that includes a location where reader can fetch the MetaBox needed for parsing this item. For example, a file writer may include MetaBoxLocationBox that includes an URL http://ex.ly/metl.bin.

In an embodiment, a file reader obtains an item with type that indicate the reduce header mode and includes a FileDescriptionBox that includes MetaBoxLocationBox. The reader fetches the MetaBox from indicated location in MetaBoxLocationBox and use the information from fetched MetaBox to parse the item data of the item, which may be located for example in a MediaDataBox.

In an embodiment, a main meta box and a supplementary meta box may reside in different files, or a main meta box may be pre-defined for example in a standard and a supplementary meta box may reside in a file. A file that includes a supplementary meta box may not include a main meta box. A main meta box may, for example, be a MetaBox, which may conform to ISOBMFF, or be a MetaBox that includes only some child boxes, such as the ItemPropertiesBox. A supplementary meta box may, for example, be a CompactMetaBox as described earlier. Interpretation of a supplementary meta box may require availability and/or interpretation of the respective main meta box. For example, the item property association (in ItemPropertyAssociationBox) of the CompactMetaBox used the item property indices of the main meta box appended by the item property indices of the supplementary meta box. The supplementary meta box syntax may identify the respective main meta box, for example, through a URL of the file including the main meta box, an identifier (such as URI or UUID) carried in the main meta box and in the supplementary meta box, or an identifier (such as a hash value) derived from the main meta box and carried in the supplementary meta box. For the interpretation of the supplementary meta box, the main meta box and supplementary meta box may be combined through a pre-defined method. The pre-defined method may, for example, remove all item-specific information from the main meta box, keep only the item properties of the main meta box, and add any content from the supplementary meta box, such as the item property association.

Share All Pre-Defined Item Properties or all Item Properties from Another File or Meta Box In an embodiment, an ItemPropertyAssociationBox is made indicative of, or is accompanied by an indication that, all item properties that are pre-defined or defined in another file and/or another MetaBox, such as the main meta box described earlier, are associated with one or more items for with the item properties are associated in the ItemProperty AssociationBox.

In an embodiment, a new version or certain one or more flags values are defined for ItemProperty AssociationBox that are indicative of all item properties that are pre-defined or defined in another file and/or another MetaBox, such as the main meta box described earlier, to be associated with all items for with the item properties are associated in the ItemProperty AssociationBox.

In an embodiment, when the value of the essential syntax element is equal to 1 and the value of the property_index syntax element is equal to 0 for a particular loop entry in the ItemPropertyAssociationBox, the item properties that are pre-defined or defined in another file and/or another MetaBox, such as the main meta box described above, are associated with the item corresponding to the loop entry. There may be multiple sets of pre-defined item properties, from which the one that is used in the item property association may, for example, be indicated in a brand provided in the file-level (e.g., in the FileTypeBox or the ExtendedFileTypeBox), in the meta box level (e.g., as in the compaction_brands syntax element of the presented CompactMetaBox), or in the item level (e.g., using the BrandProperty).

Share Individual Item Property Container Box Between Multiple Files

In an embodiment, an item property external container box (hereafter ItemPropertyExternalContainerBox) is defined, which comprises information indicative of an external file. Item properties defined in the external file are assigned property index values within the file that includes ItemPropertyExternalContainerBox, e.g., following the property index values assigned by ItemPropertyContainerBox. The container box of ItemPropertyExternalContainerBox may be the ItemPropertiesBox.

In one embodiment, ItemPropertyExternalContainerBox comprises a URL of the external file.

In one embodiment, ItemPropertyExternalContainerBox comprises a data reference index pointing to a data reference entry that identifies the external file. A data reference entry of type 'url' as specified in ISOBMFF may be used. The data reference entry may be stored in the DataReferenceBox contained in the DataInformationBox of the MetaBox.

In an embodiment, a file writer creates a first file including at least a first item property and a second file including an ItemPropertyExternalContainerBox according to any embodiment above. The file writer creates associates the property index of the first item property of the first file as assigned through ItemPropertyExternalContainerBox with an item of the second file.

In an embodiment, a file reader parses, from a second file, ItemPropertyExternalContainerBox according to any embodiment above. The file reader assigns property index value to the first item property of the first file as assigned through ItemPropertyExternalContainerBox. The file reader parses an association of the assigned property index value to an item in the second file and concludes that the first item property is to be applied to the item.

Share Individual Item Properties Between Multiple Files

In an embodiment, an external data item property is defined, which comprises information indicative of a file and an item property within the file.

In one embodiment, an external data item property comprises a URL of the file and a hash value derived from the item property within the file pointed to by the URL.

In one embodiment, an external data item property comprises a URL of the file and a property index of the item property within the file pointed to by the URL. Some features of the following syntax may be used in this embodiment. The location syntax element includes the URL of the file, and property_index indicates the index of the item property within the file pointed to by the URL.

```
aligned(8) class ExternalDataProperty
  extends ItemFullProperty('extd', 0, flags) {
  utf8string location;
  bit(1) reserved = 0;
  if (flags & 1)
    unsigned int(15) property_index;
  else
    unsigned int(7) property_index;
}
```

In one embodiment, an external data item property comprises a data reference index pointing to a data reference entry that identifies the file and a hash value derived from the item property within the file pointed to by data reference index. A data reference entry of type 'url' as specified in ISOBMFF may be used. The data reference entry may be stored in the DataReferenceBox included in the DataInformationBox of the MetaBox.

In an embodiment, an external data item property comprises a data reference index pointing to a data reference entry that identifies the file and property index of the item property within the file identified by the data reference entry. A data reference entry of type 'url' as specified in ISOBMFF may be used. The data reference entry may be stored in the DataReferenceBox included in the DataInformationBox of the MetaBox.

In an embodiment, a file writer creates a first file including a first item property and a second file including an external data item property according to any embodiment above. The file writer creates the external data item property in a manner that it identifies the first item property of the first file according to any embodiment above.

In an embodiment, a file reader parses, from a second file, an external data item property according to any embodiment above. The file reader parses from the external data item property that a first item property of a first file, as described according to any embodiment above, is to be applied when the external data item property is associated to any item in the second file.

In an embodiment, a new version of ItemPropertyAssociationBox or a new type of item property association box (e.g., called ExternalItemPropertyAssociationBox), which may be included in ItemPropertiesBox, is defined for referencing item properties of another file and/or of another MetaBox, such as the main meta box described earlier. The ExternalItemProperty AssociationBox may identfy the file and/or the meta box it is referencing, e.g., through an identifier of the file and/or the meta box, such as a URL or UUID, or a hash value derived from the file and/or the meta box. The syntax and semantics of the ExternalItemPropertyAssociationBox may be like for ItemPropertyAssociationBox with the distinction that item property indices may refer to the item property indices derived from the identified file and/or meta box.

Figure 7:
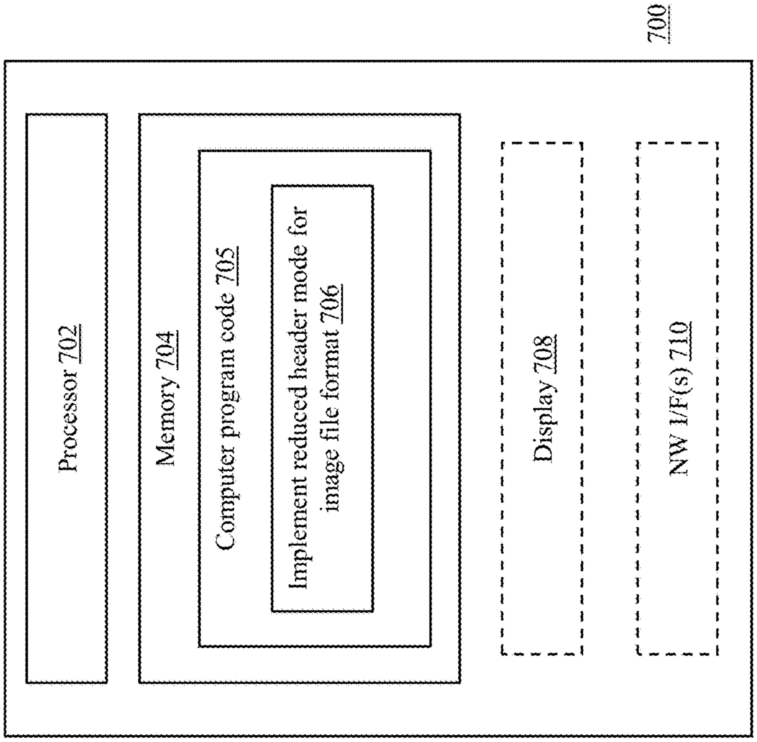
FIG. 7 is an example apparatus, which may be implemented in hardware, and is caused to, implement reduced header mode for image file format based on the examples described herein.

FIG. 7 is an example apparatus 700, which may be implemented in hardware, caused to implement reduced header mode for image file format. The apparatus 700 comprises at least one processor 702, at least one memory 704 including computer program code 705, wherein the at least one memory 704 and the computer program code 705 are configured to, with the at least one processor 702, cause the apparatus 700 to implement reduced header mode for image file format.

The apparatus 700 optionally includes a display 708 that may be used to display content during rendering. The apparatus 700 optionally includes one or more network (NW) interfaces (I/F(s)) 710. The NW I/F(s) 710 may be wired and/or wireless and communicate over the Internet/other network(s) via any communication technique. The NW I/F(s) 710 may comprise one or more transmitters and one or more receivers. The N/W I/F(s) 710 may comprise standard well-known components such as an amplifier, filter, frequency-converter, (de) modulator, and encoder/decoder circuitry (ies) and one or more antennas.

The apparatus 700 may be a remote, virtual or cloud apparatus. The apparatus 700 may be either a coder or a decoder, or both a coder and a decoder. The at least one memory 704 may be implemented using any suitable data storage technology, such as semiconductor based memory devices, flash memory, magnetic memory devices and systems, optical memory devices and systems, fixed memory and removable memory. The at least one memory 704 may comprise a database for storing data. The apparatus 700 need not comprise each of the features mentioned, or may comprise other features as well. The apparatus 700 may correspond to or be another embodiment of the apparatus 50 shown in FIG. 1 and FIG. 2. The apparatus 700 may correspond to or be another embodiment of the apparatuses shown in FIG. 12, including UE 110, RAN node 170, or network element(s) 190.

Figure 8:
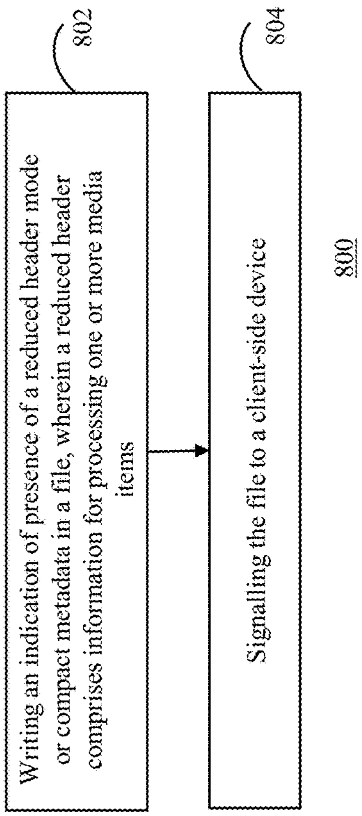
FIG. 8 is an example method to implement the embodiments described herein, in accordance with an embodiment.

FIG. 8 is an example method 800 to implement the examples described herein, in accordance with an embodiment. At 802, the method 800 includes writing an indication of presence of a reduced header mode or compact metadata in a file, wherein a reduced header comprises information for processing one or more media items. At 804, the method 900 includes signaling the file to a client-side device.

Figure 12:
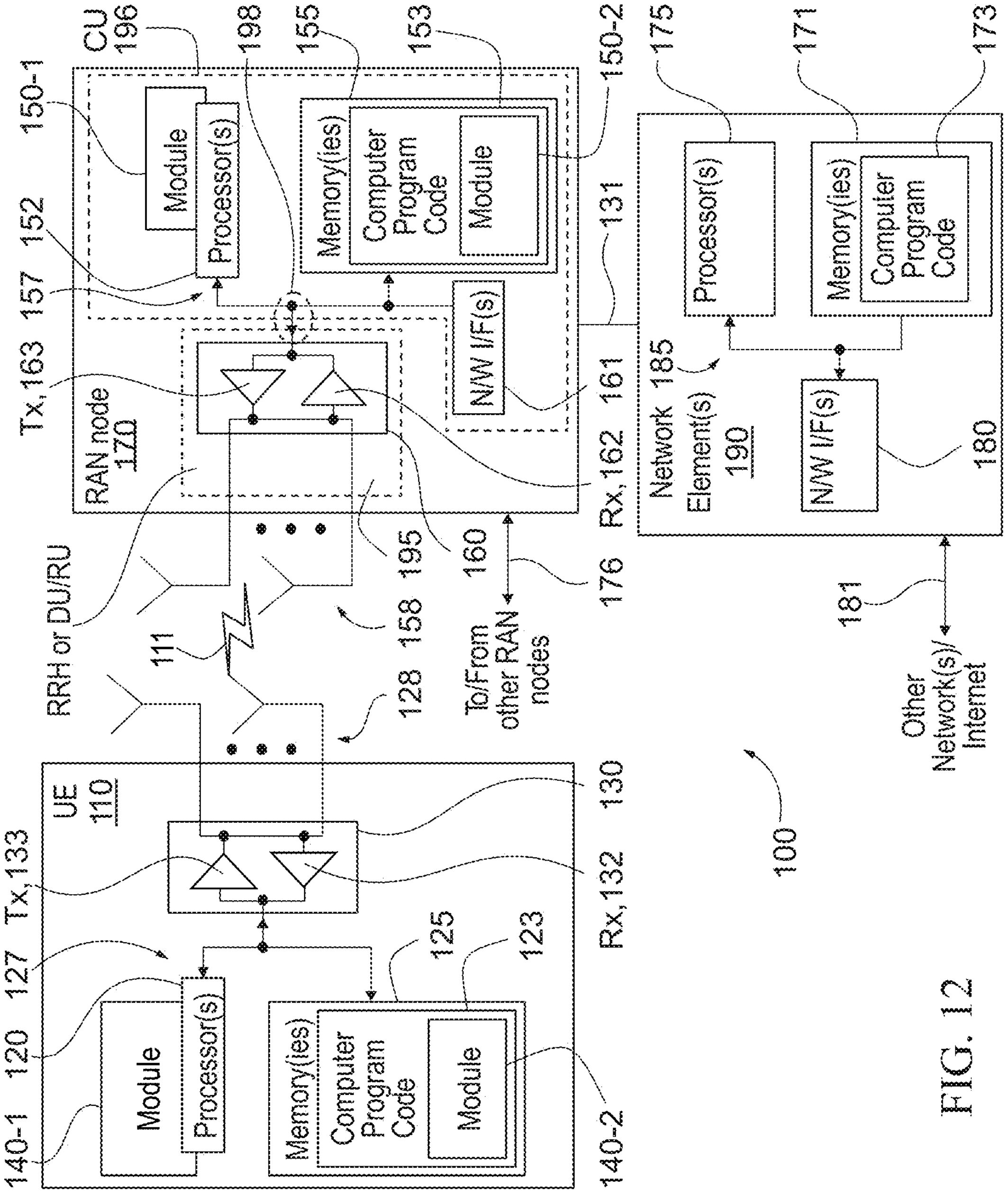
FIG. 12 is a block diagram of one possible and non-limiting system in which the example embodiments may be practiced.

The method 800 may be performed with an apparatus described herein, for example, the apparatus 50, 700, any apparatus of FIG. 12, or any other apparatus described herein.

Figure 9:
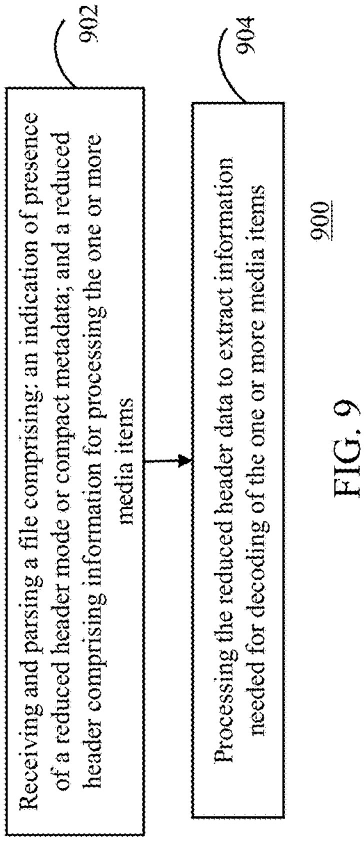
FIG. 9 is another example method to implement the embodiments described herein, in accordance with another embodiment.

FIG. 9 is an example method 900 to implement the examples described herein, in accordance with an embodiment. At 902, the method 900 includes receiving and parsing a file comprising: an indication of presence of a reduced header mode or compact metadata; and a reduced header comprising information for processing the one or more media items. At 904, the method 900 includes processing the reduced header data to extract information needed for decoding of the one or more media items.

The method 900 may be performed with an apparatus described herein, for example, the apparatus 50, 700, any apparatus of FIG. 12, or any other apparatus described herein.

Figure 10:
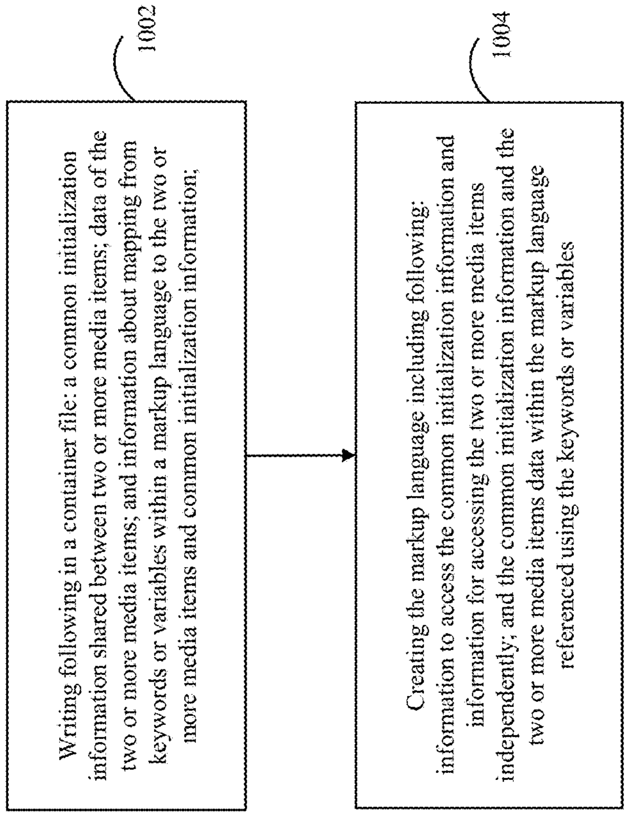
FIG. 10 is yet another example method to implement the embodiments described herein, in accordance with another embodiment.

FIG. 10 is an example method 1000 to implement the examples described herein, in accordance with an embodiment. At 1002, the method 1000 includes writing following in a container file: a common initialization information shared between two or more media items; data of the two or more media items; and information about mapping from keywords or variables within a markup language to the two or more media items and common initialization information. At 1004, the method 1000 includes creating the markup language including following: information to access the common initialization information and information for accessing the two or more media items independently; and the common initialization information and the two or more media items data within the markup language referenced using the keywords or variables.

The method 1000 may be performed with an apparatus described herein, for example, the apparatus 50, 700, any apparatus of FIG. 12, or any other apparatus described herein.

Figure 11:
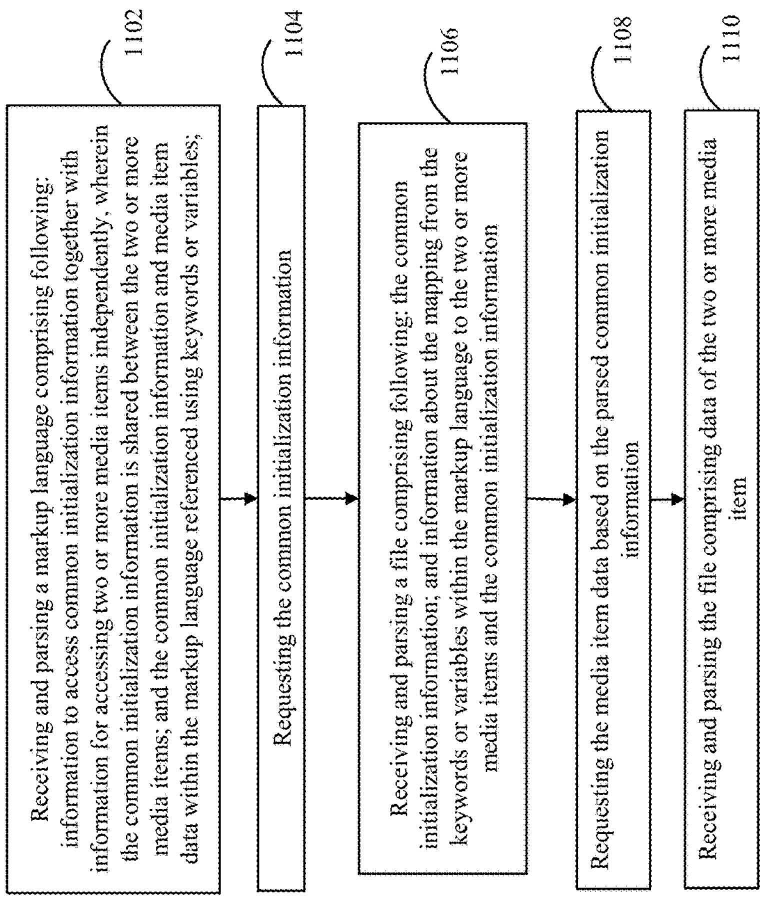
FIG. 11 is still another example method to implement the embodiments described herein, in accordance with another embodiment.

FIG. 11 is an example method 1100 to implement the examples described herein, in accordance with an embodiment. At 1102, the method 1100 includes receiving and parsing a markup language comprising following: information to access common initialization information together with information for accessing two or more media items independently, wherein the common initialization information is shared between the two or more media items; and the common initialization information and media item data within the markup language referenced using keywords or variables. At 1104, the method 1100 includes requesting the common initialization information. At 1106, the method 1100 includes receiving and parsing a file comprising following: the common initialization information; and information about the mapping from the keywords or variables within the markup language to the two or more media items and the common initialization information. At 1108, the method 1100 includes requesting the media item data based on the parsed common initialization information. At 1110, the method 1100 includes receiving and parsing the file comprising data of the two or more media item.

The method 1100 may be performed with an apparatus described herein, for example, the apparatus 50, 700, any apparatus of FIG. 12, or any other apparatus described herein.

Referring to FIG. 12, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with a radio access network (RAN) node 170 via a wireless link 111.

The RAN node 170 in this example is a base station that provides access by wireless devices such as the UE 110 to the wireless network 100. The RAN node 170 may be, for example, a base station for fifth generation cellular network technology (5G), also called New Radio (NR). In 5G, the RAN node 170 may be a NG-RAN node, which is defined as either a gNB (e.g., base station for 5G/NR, for example, a node providing NR user plane and control plane protocol terminations towards the UE, and connected via the NG interface to the 5GC) or an ng (new generation)-eNB. A gNB is a node providing NR user plane and control plane protocol terminations towards the UE, and connected via the NG interface to a 5G core network (5GC) (such as, for example, the network element(s) 190). The ng-eNB, is a node providing evolved universal terrestrial radio access (E-UTRA), for example, the LTE radio access technology, user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), service data adaptation protocol (SDAP) and PDCP protocols of the gNB or RRC and packet data convergence protocol (PDCP) protocols of the en-gNB (e.g., node providing NR user plane and control plane protocol terminations towards the UE, and acting as secondary node in E-UTRA-NR dual connectivity (EN-DC)) that controls the operation of one or more gNB-DUs. The gNB-CU terminates the interface between CU and DU control interface (F1 or F1-C) interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting radio link control (RLC), MAC and physical layer (PHY) layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an ENB (evolved NodeB) base station, for example, long term evolution (LTE), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also include its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that 'cells' perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to implement reduced header mode for image file format. Computer program code 173 may also be configured to implement reduced header mode for image file format.

As described above, FIGS. 8, 9, 10 and 11 include flowcharts of an apparatus (e.g. 50, 700, or any other apparatuses described herein), method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, or 704) of an apparatus employing an embodiment of the present invention and executed by processing circuitry (e.g. 56, 120, or 702) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart(s) of FIGS. 8, 9, 10 and 11. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

In the above, some example embodiments have been described with the help of syntax of the bitstream. It needs to be understood, however, that the corresponding structure and/or computer program may reside at the encoder for generating the bitstream and/or at the decoder for decoding the bitstream.

In the above, where example embodiments have been described with reference to an encoder, it needs to be understood that the resulting bitstream and the decoder have corresponding elements in them. Likewise, where example embodiments have been described with reference to a decoder, it needs to be understood that the encoder has structure and/or computer program for generating the bitstream to be decoded by the decoder.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, and the like.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory (ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Circuitry or Circuit: As used in this application, the term 'circuitry' or 'circuit' may refer to one or more or all of the following:

(a) hardware-only circuit implementations (such as implementations in only analog and/or digital circuitry); and
(b) combinations of hardware circuits and software, such as (as applicable):
    (i) a combination of analog and/or digital hardware circuit(s) with software/firmware; and
    (ii) any portions of hardware processor(s) with software (including digital signal processor(s)), software, and memory (ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

What is claimed is:

1. An apparatus comprising at least one processor; and
at least one memory storing instructions that, when executed by the at least one processor, cause the apparatus at least to perform:
writing in a file an indication of presence of a reduced header or compact metadata, and defining the reduced header to comprise information for processing one or more media items in the file, wherein the indication is included in a file description box present at file-level, and wherein the file description box is positioned immediately after a file-type box;
writing a metabox at file-level, wherein the metabox is extended to indicate the reduced header; and
signaling the extended metabox using a new version of the metabox or with one or more flags of the extended metabox.

2. The apparatus of claim 1, wherein the apparatus is caused to perform:
indicating a set of pre-defined information, from one or more sets of pre-defined information, for parsing the metabox, wherein the indication is used to select and initialize a decoder for decoding the one or more media items;
wherein the indication of the set of pre-defined information is comprised in a file description box present at file-level; and
wherein the file description box comprises information describing the one or more media items that is sufficient to select and initialize a decoder.

3. The apparatus of claim 1, wherein the apparatus is further caused to perform:
defining a compact item header structure, wherein the compact item header structure is comprised in the metabox, and wherein the compact item header structure comprises properties describing the one or more media items; and
extending the metabox to indicate presence of the compact item header structure.

4. The apparatus of claim 1, wherein the indication of presence of the reduced header is comprised in a file description box present at file-level immediately following a file type box or is comprised in an extended type box or an original file type box.

5. An apparatus comprising at least one processor; and
at least one memory storing instructions that, when executed by the at least one processor, cause the apparatus at least to perform:
receiving a new version of a metabox or flags of the metabox, wherein the new version of the metabox or the flags of the metabox indicate a reduced header or compact metadata in a file;
receiving and parsing a file description box indicating presence of the reduced header or the compact metadata; and
processing one or more media items of the file based at least on information comprised in the reduced header or the compact metadata.

6. The apparatus of claim 5, wherein the apparatus is caused to perform:
receiving an indication for indicating a set of pre-defined information, from one or more sets of pre-defined information, for parsing of the metabox;
parsing of the metabox based on the set of pre-defined information;
selecting and initializing a decoder based on the indication; and
decoding with the decoder the one or more media items.

7. The apparatus of claim 5, wherein the apparatus is further caused to perform:
receiving a compact item header structure, wherein the compact item header structure is comprised in the metabox, and wherein the metabox is extended to indicate presence of the compact item header structure, wherein the compact item header structure comprises properties describing the one or more media items; and
processing the one or more media items based on the compact item header structure.

8. The apparatus of claim 5, wherein the apparatus is further caused to perform:
reading, parsing or obtaining the indication of presence of the reduced header from a filetypebox.

9. A method comprising:
writing in a file an indication of presence of a reduced header or compact metadata, and defining the reduced header to comprise information for processing one or more media items in the file, wherein the indication is included in a file description box present at file-level, and wherein the file description box is positioned immediately after a file-type box;
writing a metabox at file-level, wherein the metabox is extended to indicate the reduced header; and
signaling the extended metabox using a new version of the metabox or with one or more flags of the extended metabox.

10. The method of claim 9 further comprising:
indicating a set of pre-defined information, from one or more sets of pre-defined information for parsing of the metabox, wherein the indication is intended to be used to select and initialize a decoder that decodes the one or more media items;
wherein the indication of the set of pre-defined information is comprised in a file description box present at file-level; and
wherein the file description box comprises information describing the one or more media items that is sufficient to select and initialize a decoder.

11. The method of claim 9 further comprising:
defining a compact item header structure, wherein the compact item header structure is comprised in the metabox, and wherein the compact item header structure comprises properties describing the one or more media items; and
extending the metabox to indicate presence of the compact item header structure.

12. The method of claim 9, wherein the indication of presence of the reduced header is comprised in a file description box present at file-level immediately following a file type box or is comprised in an extended type box or an original file type box.

13. A method comprising:
receiving a new version of a metabox or flags of the metabox, wherein the new version of the metabox or the flags of the metabox indicate a reduced header or compact metadata in a file;

receiving and parsing a file description box indicating presence of the reduced header or the compact metadata; and processing one or more media items of the file based at least on information comprised in the reduced header or the compact metadata in the file.

14. The method of claim 13, further comprising:

receiving an indication for indicating a set of pre-defined information, from one or more sets of pre-defined information, to be used for parsing of the metabox;

parsing the metabox based on the set of pre-defined information;

selecting and initializing a decoder based on the indication; and decoding with the decoder the one or more media items.

15. The method of claim 13, further comprising:

receiving a compact item header structure, wherein the compact item header structure is comprised in the metabox, and wherein the metabox is extended to indicate presence of compact item header structure, wherein the compact item header structure comprises properties describing the one or more media items; and processing the one or more media items based on the compact item header structure.

16. The method of claim 13, further comprising: reading, parsing or obtaining the indication of presence of the reduced header from a filetypebox.

17. The apparatus of claim 1, wherein the file description box is positioned at file-level immediately following a file type box, with an extended type box and/or a free space box in between.

18. The apparatus of claim 1, wherein the file description box comprises an indication of both a reduced header mode and a normal header mode.

19. The apparatus of claim 2, wherein the file description box comprises information sufficient to select and initialize the decoder without parsing additional metadata outside the file description box.

20. The apparatus of claim 5, wherein the processing of the one or more media items comprises selecting and initializing the decoder solely based on information parsed from the file description box.

* * * * *